US011787708B2

(12) United States Patent
Dingman et al.

(10) Patent No.: US 11,787,708 B2
(45) Date of Patent: Oct. 17, 2023

(54) SUBSEA SEDIMENT SEPARATION AND FILTRATION SYSTEM

(71) Applicant: Delta SubSea LLC, Montgomery, TX (US)

(72) Inventors: Scott Paul Dingman, Montgomery, TX (US); Perry Loughridge, Montgomery, TX (US)

(73) Assignee: DELTA SUBSEA LLC, Montgomery, TX (US)

( * ) Notice: Subject to any disclaimer, the term of this patent is extended or adjusted under 35 U.S.C. 154(b) by 0 days.

(21) Appl. No.: 18/096,226

(22) Filed: Jan. 12, 2023

(65) Prior Publication Data

US 2023/0166987 A1 Jun. 1, 2023

Related U.S. Application Data

(62) Division of application No. 17/395,265, filed on Aug. 5, 2021, now Pat. No. 11,649,176.

(Continued)

(51) Int. Cl.
 *C02F 1/38* (2023.01)
 *B01D 21/26* (2006.01)
 (Continued)

(52) U.S. Cl.
 CPC ............ *C02F 1/38* (2013.01); *B01D 17/0217* (2013.01); *B01D 21/267* (2013.01); *B09C 1/00* (2013.01);
 (Continued)

(58) Field of Classification Search
 CPC .......... C02F 1/38; C02F 1/40; C02F 2101/32; C02F 2103/08; C02F 2103/10;
 (Continued)

(56) References Cited

U.S. PATENT DOCUMENTS 5,302,294 A 4/1994 Schubert
5,344,255 A 9/1994 Toor
(Continued)

FOREIGN PATENT DOCUMENTS

CN 110607799 A 12/2019
WO 2021151515 A1 8/2021

*Primary Examiner* — Liam Royce
(74) *Attorney, Agent, or Firm* — Jason P. Mueller; FisherBroyles, LLP

(57) ABSTRACT

A disclosed subsea sediment separation and filtration system includes first and second separation devices, a spreader apparatus, and a storage device. The first separation device receives a water/sediment/oil mixture and from a subsea surface and separates the mixture into a first component containing cleaned sediment and a second component containing a water/oil mixture. The spreader apparatus disperses the cleaned sediment of the first component into a subsea environment of the spreader apparatus. The second separation device receives the second component from the first separation device and separates the second component into a cleaned water component and an oil component. The second separation device disperses the cleaned water component into a subsea environment of the second separation device and provides the oil component to the storage device. The first separation device may include a plurality of hydrocyclone devices, and the second separation device may include a high pressure hydrocyclone device.

8 Claims, 33 Drawing Sheets

Related U.S. Application Data

(60) Provisional application No. 63/062,410, filed on Aug. 6, 2020, provisional application No. 63/061,288, filed on Aug. 5, 2020.

(51) Int. Cl.
    *B01D 17/02* (2006.01)
    *C02F 1/40* (2023.01)
    *B09C 1/00* (2006.01)
    *E02D 19/04* (2006.01)
    *C02F 101/32* (2006.01)
    *C02F 103/08* (2006.01)
    *C02F 103/10* (2006.01)

(52) U.S. Cl.
    CPC ............ *C02F 1/40* (2013.01); *C02F 2101/32* (2013.01); *C02F 2103/08* (2013.01); *C02F 2103/10* (2013.01); *C02F 2301/066* (2013.01); *C02F 2301/08* (2013.01); *E02D 19/04* (2013.01)

(58) Field of Classification Search
    CPC ........... C02F 2301/066; C02F 2301/08; B01D 17/0217; B01D 21/267; B09C 1/00; E02D 19/04

See application file for complete search history.

(56) References Cited

U.S. PATENT DOCUMENTS

| | | |
|---|---|---|
| 6,139,730 A | 10/2000 | Buehler |
| 6,245,955 B1 | 6/2001 | Smith |
| 10,526,229 B2 * | 1/2020 | Vette ................ C02F 1/004 |
| 11,027,987 B1 | 6/2021 | Andalibian |
| 2004/0060876 A1 | 4/2004 | Tipton |
| 2013/0118960 A1 | 5/2013 | Tandon |
| 2015/0052785 A1 | 2/2015 | Henriksen |
| 2018/0250724 A1 | 9/2018 | Asolekar |
| 2020/0139266 A1 | 5/2020 | Daasvatn |

\* cited by examiner

SUBSEA SEDIMENT SEPARATION AND FILTRATION SYSTEM

CROSS-REFERENCE TO RELATED APPLICATIONS

The present application is a Divisional of U.S. patent application Ser. No. 17/395,265, filed Aug. 5, 2021, which claims the benefit of U.S. Provisional Patent Application No. 63/061,288, filed Aug. 5, 2020 and 63/062,410, filed Aug. 6, 2020, the entire contents of which are incorporated herein by reference.

BRIEF DESCRIPTION OF THE DRAWINGS

The accompanying drawings are part of this disclosure and are incorporated into the specification. The drawings illustrate example embodiments of the disclosure and, in conjunction with the description and claims, serve to explain various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein. Like numbers refer to like, but not necessarily the same or identical, elements throughout.

DETAILED DESCRIPTION

This disclosure generally relates to cofferdams having suction pile anchors. A convention cofferdam is a watertight enclosure that may be pumped dry to permit construction work below a waterline, as when building a bridge or repairing a ship. Cofferdams may also be used in sub-sea applications when sediment is needed to be removed from a subsea location. Suction piles (also known as suction caissons) are fixed platform anchors that are used as anchors for offshore installations, oil platforms, oil drilling platforms, etc. A conventional suction pile is essentially a large cylinder that is closed at one end. The structure is lowered to the ocean floor, with a downwardly facing open end, where the structure partially sinks into ocean-floor sediment of its own weight. Water is then pumped out of the structure causing a negative pressure inside the structure. The negative pressure forces the suction pile into the seabed sediment whereby the suction pile becomes strongly attached to the ocean floor and serves as an anchor. Once installed, the suction pile resists axial and lateral loads and may be used to secure mooring lines that are attached to the suction pile at various load points. As described in greater detail below, suction piles may be attached to a cofferdam structure or the cofferdam structure may include internal structures that may be used as suction piles to secure the cofferdam structure.

Figure 1:
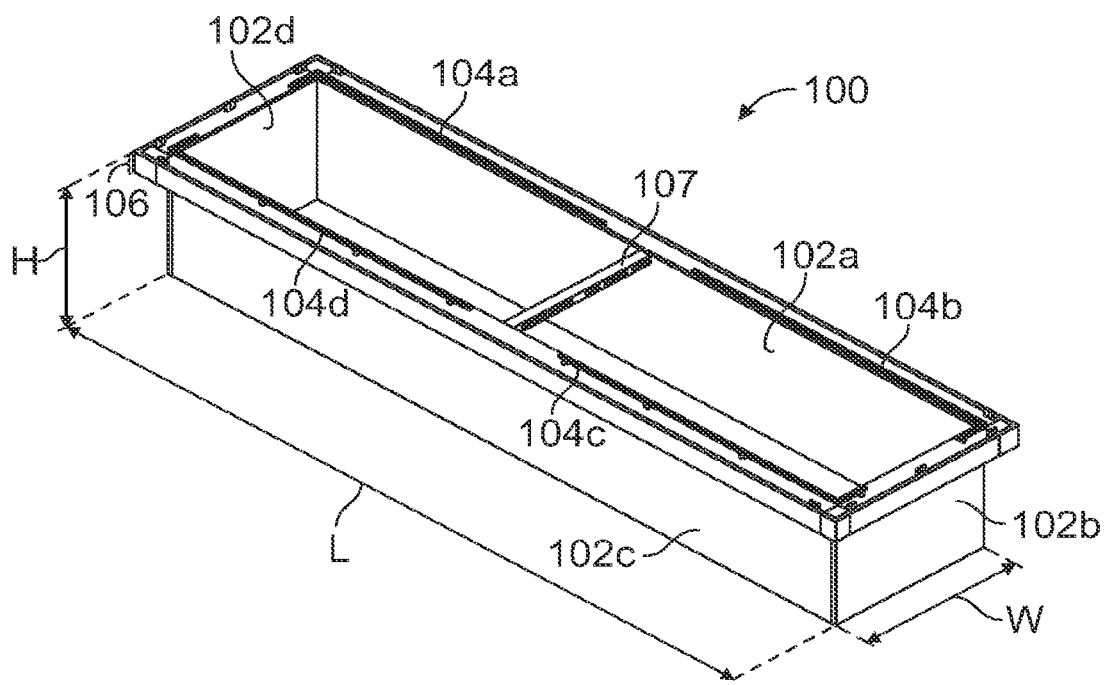
FIG. 1 is a three-dimensional perspective view of a cofferdam structure including suction piles, in accordance with one or more embodiments of the disclosure.

FIG. 1 is a three-dimensional perspective view of a cofferdam structure 100 including suction piles, in accordance with one or more embodiments of the disclosure. As described in greater detail below, cofferdam structure 100 includes double walls each having an open end at the bottom and a closed end at the top so that walls function as a suction pile. In this way, water may be partially or completely removed from the walls of cofferdam structure 100 so that induced negative pressure within the walls generates a net force that pushes cofferdam structure 100 into a sediment layer of the seabed. Cofferdam structure 100 may be used for deep sea operations when it is necessary to excavate sediment from an area of the sea floor for maintenance or installation of a subsea structure such as a drilling rig, an oil well, a pipeline, etc. Cofferdam structure 100 may also be used for undersea exploration, recovery of a shipwreck, recovery of sunken treasure, etc. In further embodiments, cofferdam structure 100 may be used for applications other than those requiring excavation from the sea floor. For example, cofferdam structure 100 may be used for oil/gas well decommissioning, well intervention, control and plugging of wells, abandoning wells, etc.

As illustrated in FIG. 1, cofferdam structure 100 includes four walls 102a, 102b, 102c, and 102d that form a rectangular open frame structure. Cofferdam structure 100 is characterized by a length L, a width W, and a height H. According to an embodiment, cofferdam structure 100 may have dimensions L=750 feet, W=150 feet, and H=120 to 150 feet. Walls 102a to 102d may be four-foot stud walls enclosing a hollow space in between, as described in greater detail below with reference to FIG. 4. Cofferdam structure 100 may further be configured to include an extended structure 106 (i.e., an overhang) around a top border region of cofferdam structure 100. In some embodiments, extended structure 106 may serve as a mud mat. Extended structure 106 may have height of from 20 to 50 feet and a width of approximately 20 feet. Other embodiments may have other dimensions for comparable features. Cofferdam structure 100 may further include a walkway 107 that may be used during maintenance or installation operations. Other embodiments may omit extended structure 106 and/or walkway 107.

As described in greater detail below, cofferdam structure 100 may include suction pile structures built into walls 102a, 102b, 102c, and 102d. As such, cofferdam structure 100 may be provided with suction pile equipment that is configured to allow removal of water from walls 102a, 102b, 102c, and 102d. As shown in FIG. 1, cofferdam structure 100 may include fluidic pipes or tubing 104a to 104d that may be configured to make a fluidic connection with internal spaces of walls 102a to 102d. Fluidic pipes or tubing 104a to 104d may further be connected by a manifold (not shown). An ROV may make one or more fluidic connections with fluidic pipes or tubing 104a to 104d through various pieces of suction pile equipment. In this way, an ROV may partially or completely pump water out of walls 102a to 102d. Use of an ROV, however, is only one method by which cofferdam structure 100 may be accessed, ballasted/de-ballasted, etc. In other embodiments, fluidic connections with fluidic pipes or tubing 104a to 104d of cofferdam structure 100 may be made using any suitable device such as a topside pump, a skid-mounted pump, a subsea pump, etc.

Figure 2:
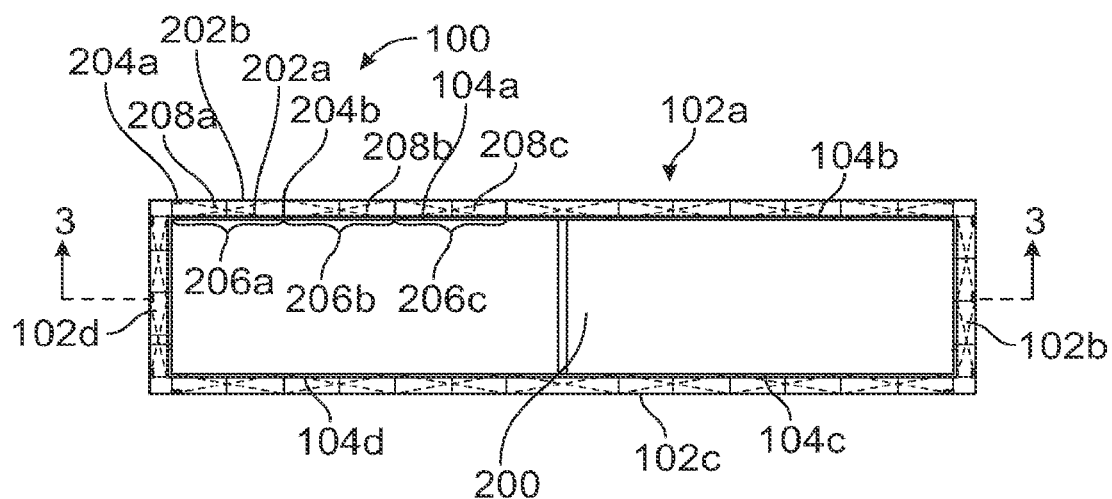
FIG. 2 is a top view of a cofferdam structure including suction piles, in accordance with one or more embodiments of the disclosure.

FIG. 2 is a top view of cofferdam structure 100 of FIG. 1, in accordance with one or more embodiments of the disclosure. Walls 102a to 102d enclose an open region 200. Once cofferdam structure 100 is installed on the seabed, sediment may be removed from region 200 as mentioned above. Each of walls 102a to 102d may be a double-walled structure having an inner wall 202a and an outer wall 202b. Further, the double-walled structure may be partitioned into a plurality of compartments by partition structures 204a, 204b, etc. In this way, each double-walled structure may be configured to include a plurality of hollow regions 206a, 206b, 206c, etc. Each of regions 206a, 206b, 206c, etc. may be provided with a closed top end structure 208a, 208b, 208c, etc., and a corresponding open bottom end structure (e.g., see open bottom 406 in FIG. 4). In this way, regions 206a, 206b, 206c, etc., may be configured to act as suction piles. Each of regions 206a, 206b, 206c, etc., may be fluidically coupled via fluidic pipes or tubing 104a to 104d so that water may be removed from regions 206a, 206b, 206c, etc., to thereby induce negative pressure within regions 206a, 206b, 206c, etc. Fluidic pipes or tubing 104a to 104d may further be connected by a manifold (not shown). FIG. 2 also defines a cross section 3-3 that is used to define the cross-sectional view of cofferdam structure 100 shown in FIG. 3, and described in greater detail below.

Figure 3:
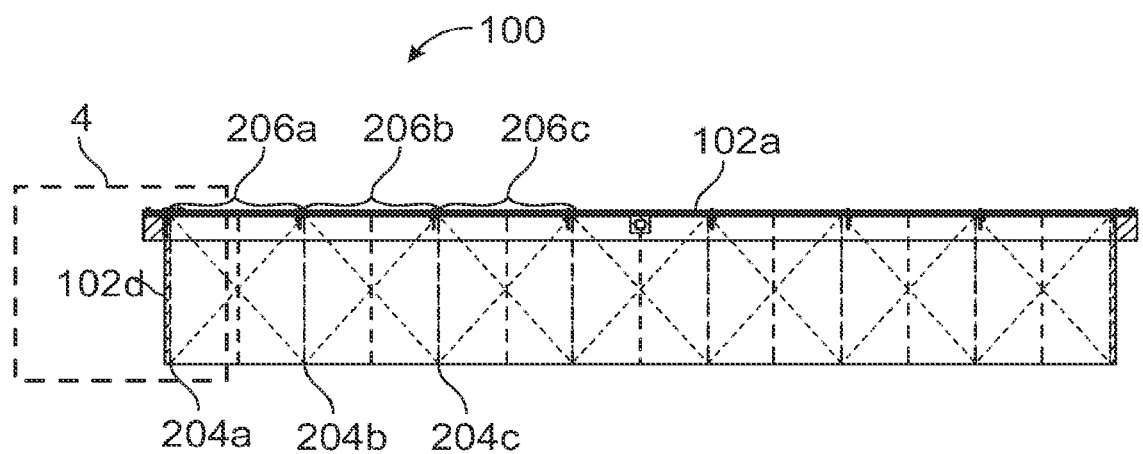
FIG. 3 is a cross-sectional view of a cofferdam structure including suction piles, in accordance with one or more embodiments of the disclosure.
Figure 4:
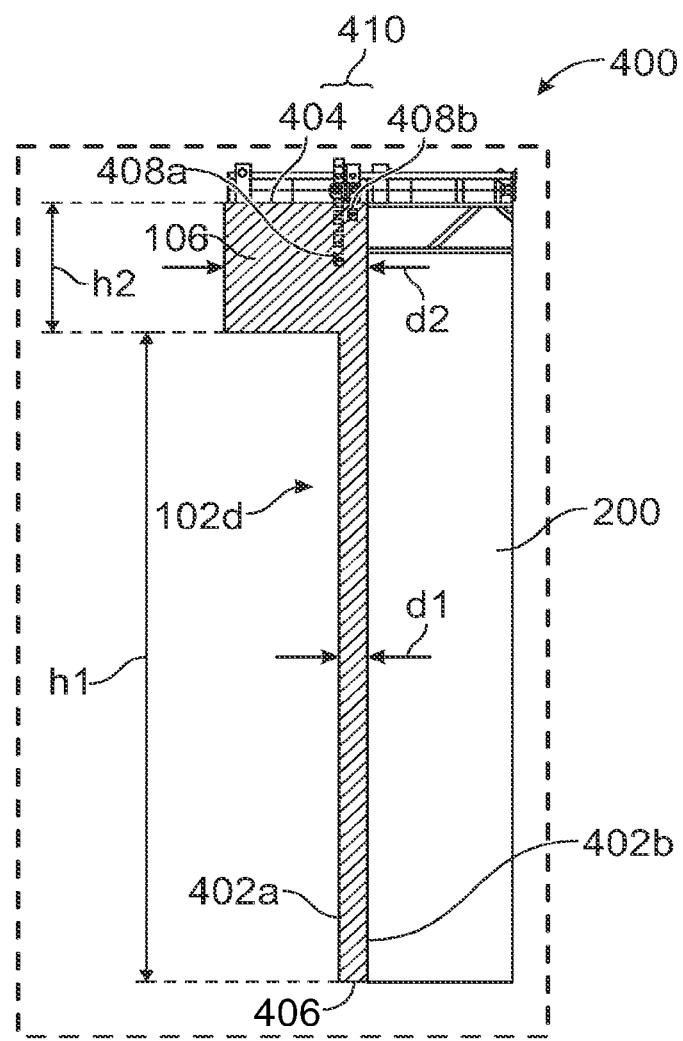
FIG. 4 is an enlarged cross-sectional view of an end wall of the cofferdam structure of FIG. 3, in accordance with one or more embodiments of the disclosure.

FIG. 3 is a cross-sectional view of cofferdam structure 100 including suction piles, in accordance with one or more embodiments of the disclosure. This cross-sectional view cuts through end wall 102d as shown in FIG. 4, and described in greater detail below. FIG. 3 also provides a side view of internal wall 102a. Although not shown in cross section, regions 206a, 206b, 206c, etc., of internal wall 102a are also indicated. Regions 206a, 206b, 206c, etc., are separated by internal partitions 204a, 204b, 204c, etc., to thereby form hollow spaces that may service as suction piles, as mentioned above and described in greater detail below.

FIG. 4 is an enlarged cross-sectional view 400 of end wall 102d of cofferdam structure 100 of FIG. 3, in accordance with one or more embodiments of the disclosure. End wall 102d includes an outer wall 402a and an inner wall 402b that forms a hollow space between walls 402a and 402b. Outer wall 402a is an externally facing wall and inner wall 402b faces internal region 200 (e.g., see FIG. 2). End wall 102d further includes a closed top 404 structure and an open bottom end 406. End wall 102d further includes extended structure 106, as described above. In this configuration, a suction pile is formed by a hollow region (e.g., shown as a hatched region) that includes a first hollow region of height h1 and second hollow region with in extended structure 106 having height h2. The first hollow region may have thickness d1 and the second hollow region may have thickness d2. In an example embodiment, h1=100 feet, d1=4 feet, h2=20 feet, and d2=20 feet. Other embodiments may have other dimensions for comparable features.

The suction pile of FIG. 4 (i.e., hatched region of FIG. 4) may further be provided with one or more fluidic conduits. In this example, two fluidic conduits 408a and 408b are shown. Fluidic conduits 408 may have various configurations. For example, fluidic conduit 408a may have a first length that extends into extended structure 106 and fluidic conduit 408b may have a second length. In this example, the first length is longer than the second length. In other embodiments, both fluidic conduits 408a and 408b may have a common length. Other embodiments may have greater or fewer fluidic conduits. In this example, fluidic conduits 408a and 408b are shown as perforated pipes that are configured to allow water to flow through a plurality of apertures. Perforated pipes may be advantageous for use in water that contains mud and/or other sediment. In this regard, perforated pipes may be less prone to clogging due to mud and/or other sediment than pipes that are not perforated. Other embodiments may have fluidic conduits 408a and 408b having smooth surfaces with a single opening at a distal end of each fluidic conduit (not shown).

Fluidic conduits 408a and 408b may be fluidically coupled to suction pile equipment 410 that may allow an ROV or other external device to couple to fluidic conduits 408a and 408b. For example, a pump provided by an ROV may be configured to fluidically couple to fluidic conduits 408a and 408b and to pump water out of the suction pile structure. In other embodiments, fluidic connections with fluidic conduits 408a and 408b may be made using any suitable device such as a topside pump, a skid-mounted pump, a subsea pump, etc.

Figure 5:
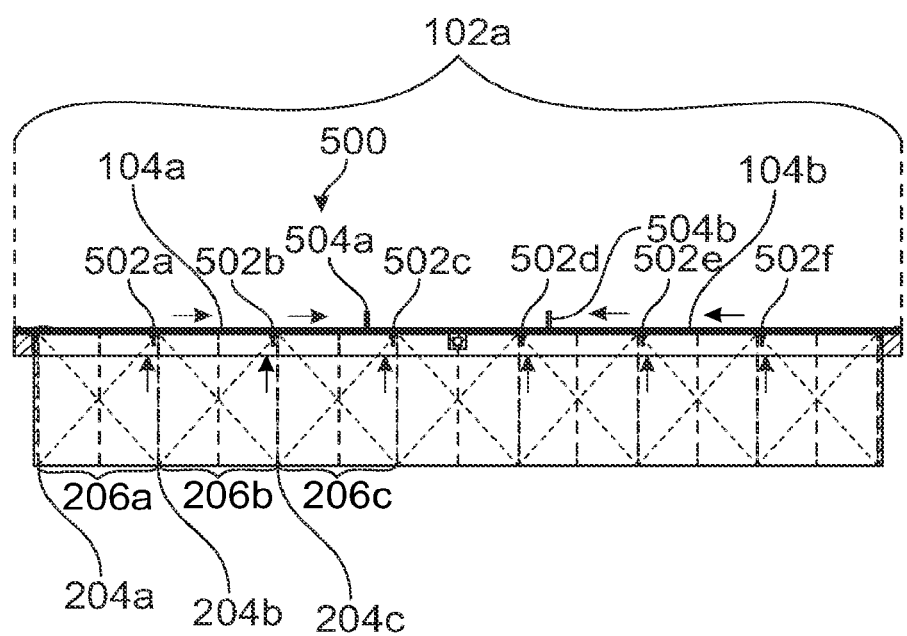
FIG. 5 is a cross-sectional view of a cofferdam structure including fluidic connections between a plurality of suction piles, in accordance with one or more embodiments of the disclosure.

FIG. 5 is a cross-sectional view 500 of a cofferdam structure including fluidic connections between a plurality of suction piles, in accordance with one or more embodiments of the disclosure. FIG. 5 shows a view similar to that of FIG. 3 that is defined by the cross section 3-3 of FIG. 2. As with FIG. 3, the view of FIG. 5 shows an internal surface of wall 102a and a cross section of wall 102d, as described above with reference to FIG. 3. As described above with reference to FIG. 2, wall 102a includes partitions 204a, 204b, 204c, etc., that divide wall 102a into a plurality of hollow regions 206a, 206b, 206c, etc. Each of regions 206a, 206b, 206c, etc., is configured as a suction pile similar to the suction pile structure (e.g., hatched region) of FIG. 4.

In further embodiments, regions 206a, 206b, 206c, etc., may be formed by welding a plurality of rectangularly-shaped suction piles together to form wall 102a. As described above with reference to FIG. 4, each region 206a, 206b, 206c, etc., may be provided with one or more fluidic conduits. In this example, fluidic conduits 502a to 502f are shown. Each of fluidic conduits 502a to 502f provide a fluidic pathway through which water may be pumped out of the various suction pile structures formed by regions 206a, 206b, 206c, etc. Fluidic conduits 502a to 502f may be accessed individually by an ROV that provides separate fluidic connections to fluidic conduits 502a to 502f. In other embodiments, fluidic connections with fluidic conduits 502a to 502f may be made using any suitable device such as a topside pump, a skid-mounted pump, a subsea pump, etc.

Alternatively, one or more of the fluidic conduits 502a to 502f may be coupled together via one or more fluidic pipes or tubing 104a to 104d, as described above with reference to FIG. 1. Fluidic pipes or tubing 104a to 104d may further be connected by a manifold (not shown). For example, fluidic conduits 502a to 502c may be coupled via fluidic pipes or tubing 104a, while fluidic conduits 502d to 502f may be coupled via fluidic pipes or tubing 104b. Fluidic pipes or tubing 104a may be further coupled to fluidic port 504a and fluidic pipes or tubing 104b may be coupled to fluidic port 504b. Fluidic ports 504a and 504b may be configured to allow an ROV to make a fluidic connection with fluidic pipes or tubing 104a and 104b, respectively. In this way, an ROV may couple to the cofferdam structure of FIGS. 1 to 5 and to pump water from multiple suction pile structures simultaneously. In other embodiments, fluidic connections with fluidic ports 504a and 504b may be made using any suitable device such as a topside pump, a skid-mounted pump, a subsea pump, etc.

Figure 6:
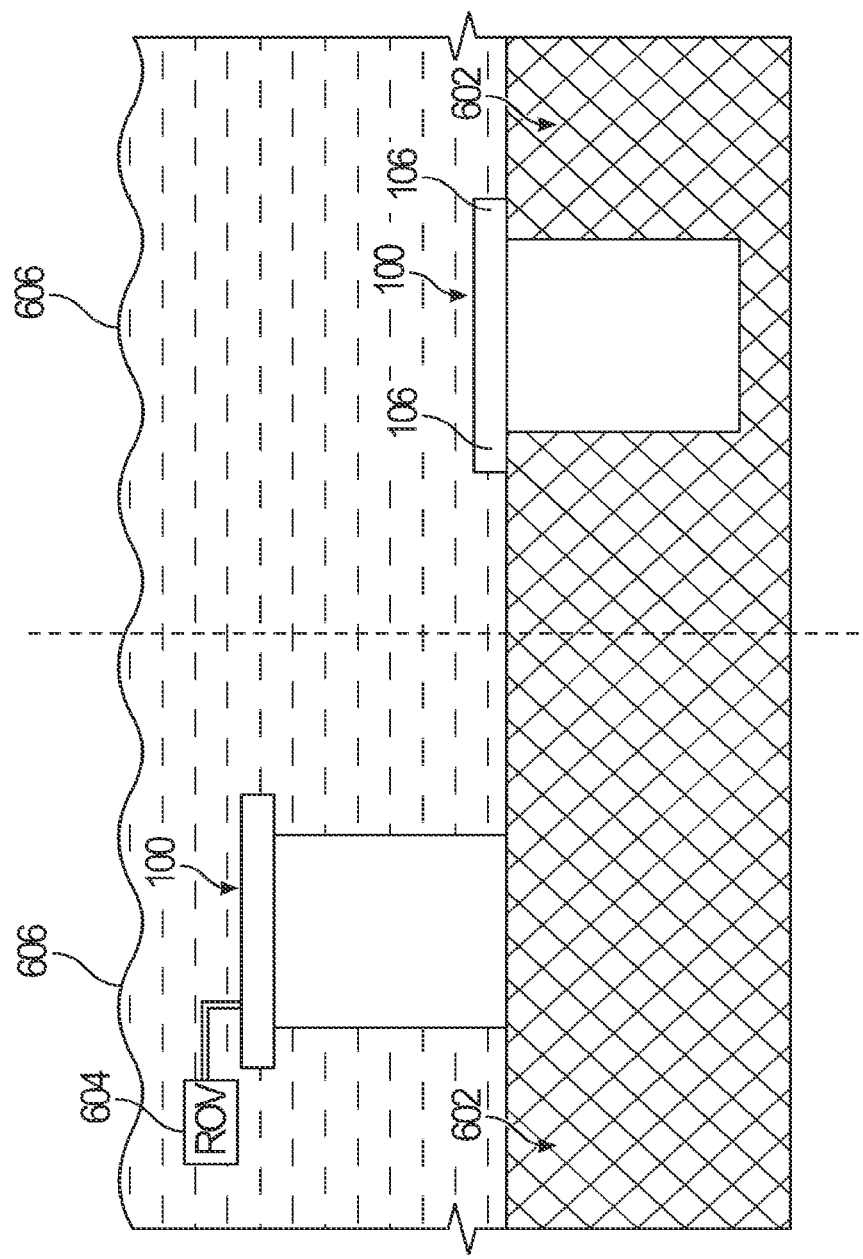
FIG. 6A illustrates an end view of a cofferdam structure including suction piles in a first configuration during installation, in accordance with one or more embodiments of the disclosure.
FIG. 6B illustrates an end view of a cofferdam structure including suction piles in a second configuration during installation, in accordance with one or more embodiments of the disclosure.

FIGS. 6A and 6B illustrate an end view of the cofferdam structure 100 of FIGS. 1 to 5 in first and second configurations during installation, in accordance with one or more embodiments of the disclosure. Cofferdam structure 100 may be installed using a process that starts with cofferdam structure 100 being lowered into the ocean. Fluidic structures (not shown in FIGS. 6A and 6B) may be opened while cofferdam structure 100 moves through water toward the ocean floor or to a subsea surface of mud or sediment 602. When cofferdam structure 100 comes to rest on a layer of mud or sediment 602 below a surface 606 of the ocean, water may be pumped out of cofferdam structure 100 by an ROV 604, as shown in FIG. 6A. In other embodiments, water may be pumped out of cofferdam structure 100 by any suitable device such as a topside pump, a skid-mounted pump, a subsea pump, etc. As described above, removal of water from cofferdam structure 100 induces negative pressure in the walls of cofferdam structure 100. After a certain amount of water is removed from the walls of cofferdam structure 100, fluidic ports (e.g., ports 504a and 504b of FIG. 5) may be closed to make a watertight connection to thereby maintain the negative pressure that develops in the walls of cofferdam structure 100.

Pressure of water above cofferdam structure 100 then forces cofferdam structure 100 into the layer of mud or sediment 602. As shown in FIG. 6B, cofferdam structure 100 may come to rest in a configuration in which extended structures 106 make contact with a surface of the mud or sediment 602 on the ocean floor. In this way, extended structures 106 may serve as a mud mat. Specific dimensions of cofferdam structure 100 may be chosen based on a particular application. For example, the height H (e.g., see FIG. 1 and related description) may be chosen based on a height of a particular thickness of mud or sediment 602 on the ocean floor, as described in greater detail below with reference to FIG. 7.

Figure 7:
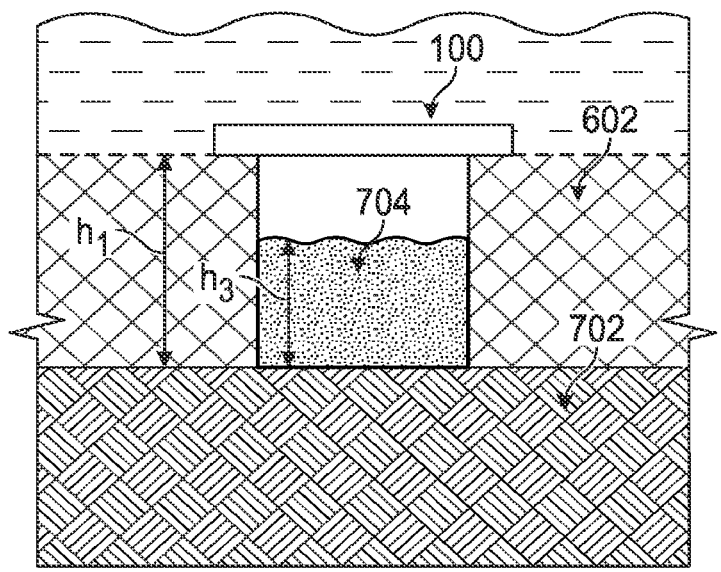
FIG. 7 illustrates an end view of a cofferdam structure including suction piles in which the height of the cofferdam structure is chosen based on a thickness of a sediment layer, in accordance with one or more embodiments of the disclosure.

FIG. 7 illustrates an end view of cofferdam structure 100 including suction piles in which a height $h1$ of the cofferdam structure is chosen based on a thickness of a mud or sediment layer 602, in accordance with one or more embodiments of the disclosure. As described above with reference to FIG. 4, in one embodiment, cofferdam structure 100 may have a height $h1$ that is approximately 100 feet. Such an embodiment may be advantageous for an application in which a sediment layer may have a thickness that is approximately 100 feet thick. The designation of height $h1$ being approximately 100 feet is merely an example and does not imply any limitation, and other embodiments may have other dimensions for comparable features. In this configuration, cofferdam structure 100 may be forced down through sediment layer 602 and may come to rest on a lower layer 702 that may have increased mechanical properties (e.g., layer 702 may be a sediment layer with an increased density or layer 702 may be bedrock).

The configuration of FIG. 7 allows mud or sediment 704 to be removed (i.e., excavated) from an internal space of cofferdam structure 100. In this example, mud or sediment 704 has been removed leaving a thickness $h3$ of mud or sediment 704. As described above, $h1$ may be approximately 100 feet. The thickness $h3$ of remaining mud or sediment 704 after excavation may be approximately 80 feet. These specific dimensions are merely an example and do not imply any limitation. Indeed, other embodiments may have other dimensions for comparable features. In order to maintain stability of cofferdam structure 100, it may be necessary to leave a thickness $h3$ of sediment within cofferdam structure 100 to maintain a seal that prevents material external to cofferdam structure 100 from entering cofferdam structure 100. If additional sediment 704 needs to be removed for a certain application, one or more additional smaller cofferdams may be installed, as described in further detail below with reference to FIG. 8.

Figure 8:
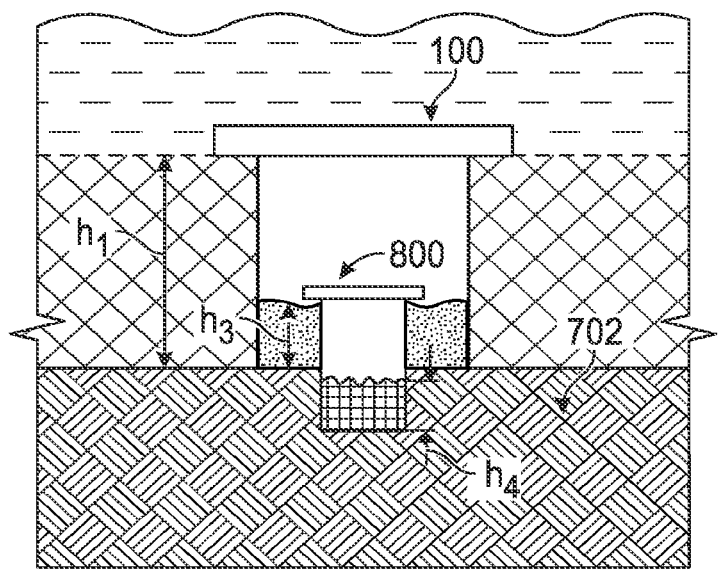
FIG. 8 illustrates a second cofferdam structure installed within a first cofferdam structure, in accordance with one or more embodiments of the disclosure.

FIG. 8 illustrates a second cofferdam structure 800 within the first cofferdam structure 100, in accordance with one or more embodiments of the disclosure. This embodiment makes it possible to remove more sediment than was removed in the example above (i.e., described with reference to FIG. 7). In this regard, it may be necessary to leave at least a thickness $h3$ of sediment to maintain stability of cofferdam structure 100. For an operation requiring removal of additional sediment, a second cofferdam structure 800 having suction piles may be installed. As shown, this second cofferdam structure 800 may allow removal of an additional amount of sediment down to a thickness of $h4$. Further, the presence of second cofferdam structure 800 allows material to be removed down to a depth that is lower than the bottom of cofferdam structure 100, as shown. In this example, $h4$ may have a height that is in a range from approximately 0 to 80 feet. These specific dimensions are merely an example and do not imply any limitation. Indeed, other embodiments may have other dimensions for comparable features as needed for various applications.

Figure 9:
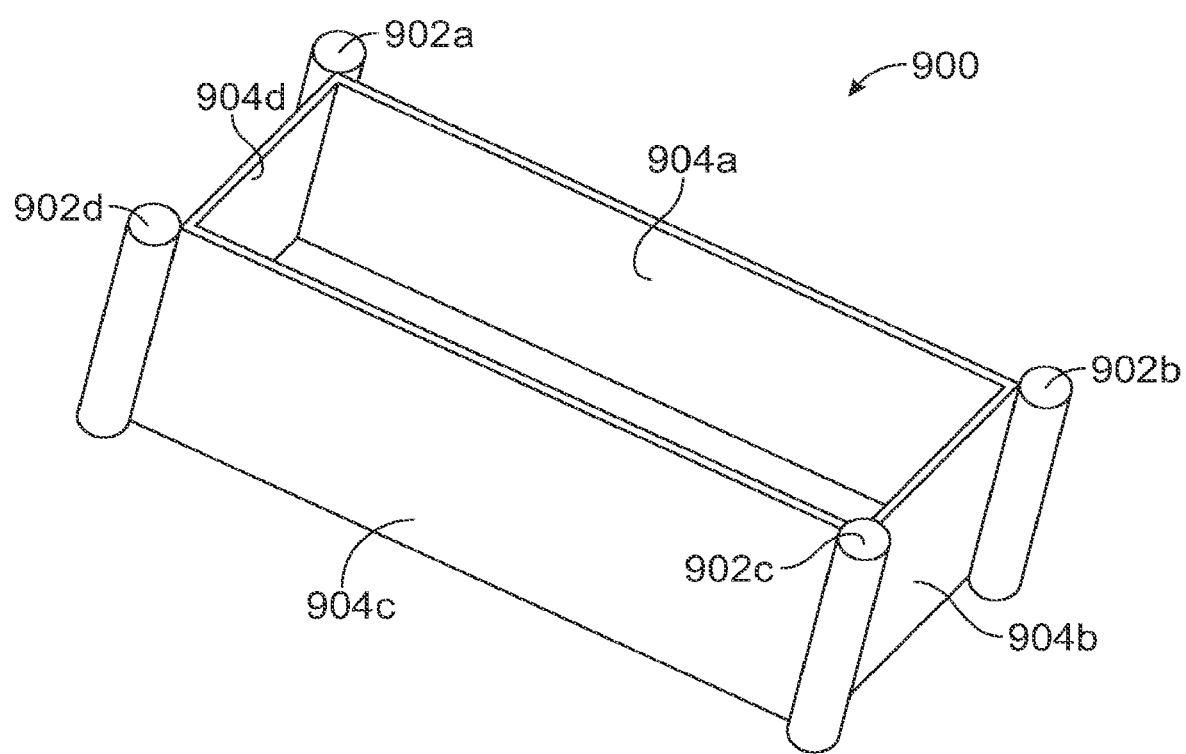
FIG. 9 is a three-dimensional perspective view of a cofferdam structure including suction piles, in accordance with one or more embodiments of the disclosure.

FIG. 9 is a three-dimensional perspective view of a further cofferdam structure 900 including suction piles, in accordance with one or more embodiments of the disclosure. In contrast to the cofferdam structure 100 of FIGS. 1 to 8, cofferdam structure 900 includes suction piles 902a to 902d attached to a frame structure that includes four walls 904a to 904d. In this regard, suction piles 902a to 902d and walls 904a to 904d may be steel structures that are fastened together. For example, walls 904a to 904d may be welded together to form a rectangular frame structure. In further embodiments, walls 904a to 904d may be attached to one another using various fasteners, such as bolts, rivets, etc. Further, suction piles 902a to 902d may be attached to walls 904a to 904d by welding or may be attached using various fasteners, such as bolts, rivets, etc. In other embodiments, suction piles 902a to 902d and walls 904a to 904d may be made of any other suitable structural material.

FIG. 9 illustrates an embodiment in which suction piles 902a to 902d are attached to corners of a rectangular frame structure that includes walls 904a to 904d. Further embodiments may include many different configurations of walls and suction piles. For example, the frame structure need not be a rectangular structure as shown in FIG. 9, but rather, may be a circle, an oval, a square, a triangle, a pentagon, a hexagon, or other multi-sided polygon. In additional embodiments, the frame structure may take any shape (e.g., a shape of a ship) as needed for a particular application. Further embodiments may include greater or fewer suction piles. For example, although FIG. 9 is shown with four circular suction piles 902a to 902d, other embodiments may have one, two, three, five, six, etc., suction piles. Further, suction piles need not have a cylindrical shape as shown in FIG. 9. In other embodiments, suction piles may have a rectangular shape, a square shape, a triangular shape, a pentagonal shape, a hexagonal shape, or may be another multi-sided polygon. Further, suction piles need not be attached to external surfaces of the rectangular frame structure of FIG. 9 but may be attached on internal surfaces, may be attached on a mixture of internal and external surfaces, or may be configured to be part of internal structures of cofferdam structure 900, as was the case with the embodiments described above with reference to FIGS. 1 to 8.

Figure 10:
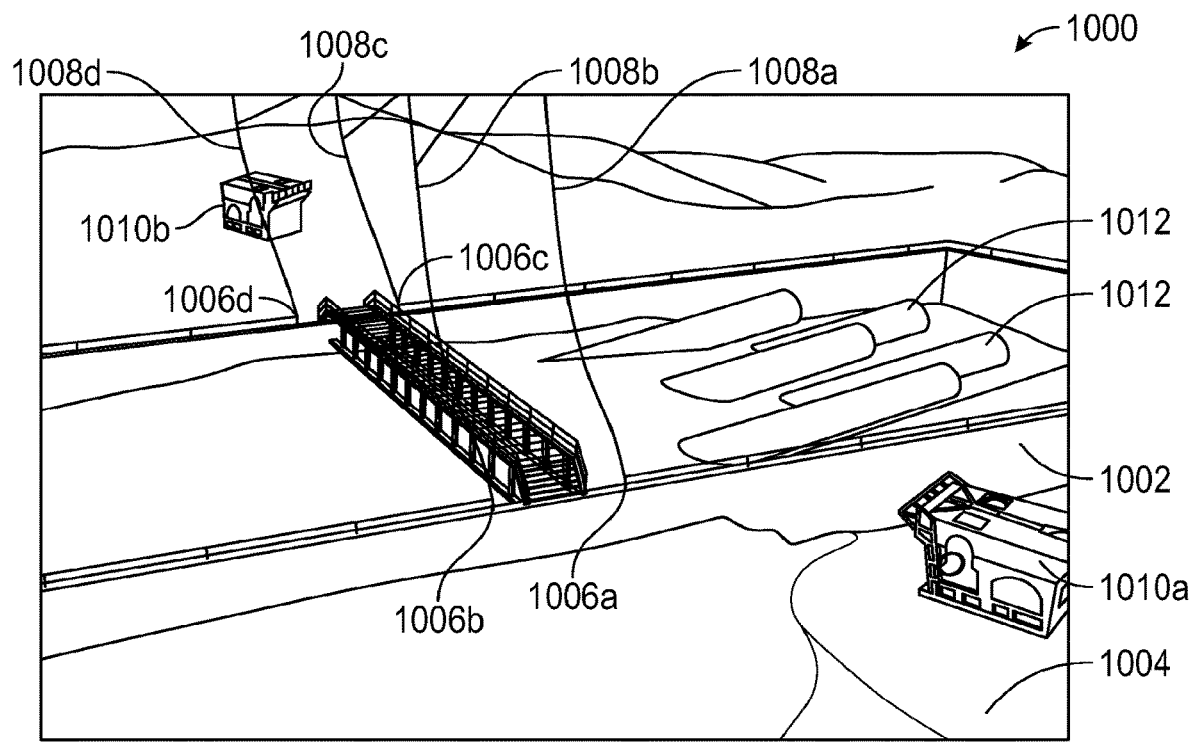
FIG. 10 is a three-dimensional perspective view of a cofferdam structure in a partially installed configuration, according to an embodiment.

FIG. 10 is a three-dimensional perspective view 1000 of a cofferdam structure 1002 in a partially installed configuration, according to an embodiment. As described above with reference to FIGS. 6A and 6B, cofferdam structure 1002 has been lowered to a subsea surface containing mud and/or sediment 1004. Fluidic conduits 1006a, 1006b, 1006c, and 1006d may be connected to hoses 1008a, 1008b, 1008c, and 1008d, which may in turn be connected with pumps provided by one or more ROVs 1010a and 1010b. Alternatively, hoses 1008a, 1008b, 1008c, and 1008d may be connected to pumps, e.g., provided on a topside vessel. Fluid may be removed from cofferdam structure 1002 via hoses 1008a, 1008b, 1008c, and 1008d to thereby generate a negative pressure within cofferdam structure 1002. The induced negative pressure with cofferdam structure 1002 generates a net force on cofferdam structure 1002 due to the weight of water above cofferdam structure 1002, as described in greater detail above. The net force on cofferdam structure 1002 causes cofferdam structure 1002 to be forced into the layer of mud or sediment, as described above with reference to FIGS. 6A and 6B.

View 1000 of FIG. 10 also shows various exposed conductors 1012. Conductors 1012 may be broken pipes associated with a damaged subsea oil well. In this regard, conductors 1012 may pose an environmental threat by leaking oil into the mud, sediment, and surrounding water. Disclosed systems and methods may be used for reclamation and remediation of such damaged subsea structures and surrounding water, mud, and sediment.

Figure 11A:
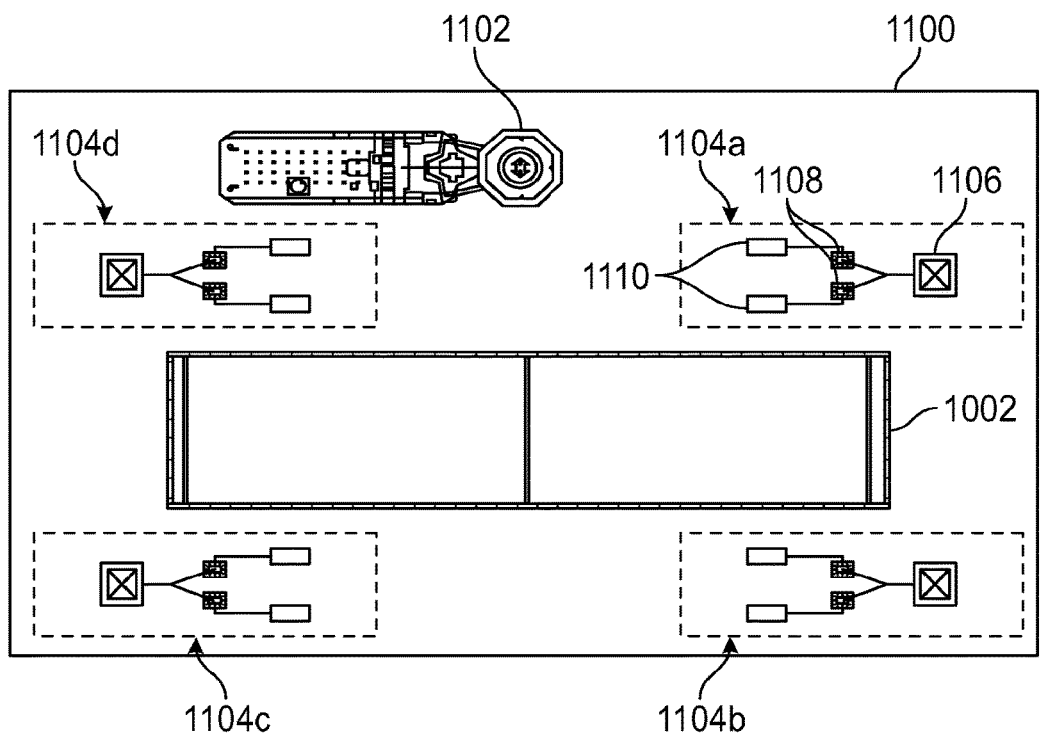
FIG. 11A is a top-down view of components of a subsea sediment separation and filtration system, according to an embodiment.
Figure 11B:
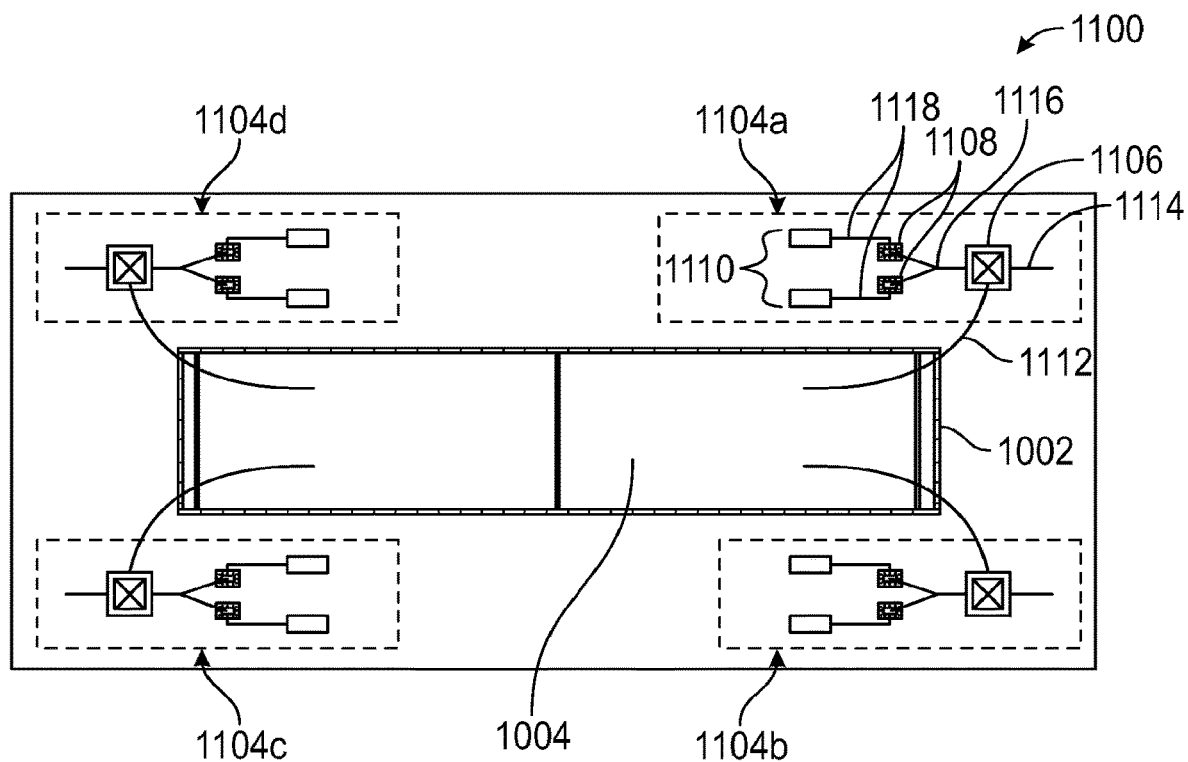
FIG. 11B is a top-down view of the subsea sediment separation and filtration system of FIG. 11A in an installed configuration, according to an embodiment.

FIGS. 11A and 11B provide top-down views of a subsea sediment separation and filtration system 1100, according to an embodiment. A topside vessel 1102 having a crane may be used to lower various components of the system 1100 to the subsea surface (e.g., subsea surface 1004, see FIG. 10) in proximity to cofferdam structure 1002. In this example, the system includes four sub-systems 1104a, 1104b, 1104c, and 1104d. Each sub-system 1104a, 1104b, 1104c, and 1104d includes a filtration tower 1106, one or more pressure vessels 1108, and one or more bladder skids 1110. Filtration tower 1106 receives a mixture of fluid and sediment that may be contaminated with oil. Filtration tower 1106 may include one or more filtering or separating devices, e.g., hydrocyclones, cross-flow filters, conventional filters, or sieves, that separate the mixture into a clean sediment component and a fluid component. The fluid component may be a mixture of seawater and oil. Pressure vessels 1108 may receive the liquid component and separate the oil from the water. The oil component may be safely recovered and stored in the bladder skids 1110. The cleaned seawater component and the cleaned sediment component may then be safely returned to the surrounding subsea environment.

The filtration tower 1106 may include a set of sieves to remove large particles of the sediment component from the fluid component. In the example the fluid component may be fed through hydrocyclones, cross-flow filters, or conventional filters to further separate small particles of the sediment component from the fluid component. Filters may include activated charcoal filters, paper filters, diatomaceous earth filters, and filters made from other media.

FIG. 11B shows the various components of the system 1100 in an installed configuration in proximity to cofferdam structure 1002. In this example, a configuration of sub-system 1104a is described in detail. Remaining sub-systems 1104b, 1104c, 1104d, are similarly configured. Sub-systems 1104a to 1104d are configured to perform a dredging operation to remove a mixture of water and sediment 1004 from a region surrounded by cofferdam structure 1002. In this regard, system 1100 includes pumps (not shown) that cause suction in a conduit 1112 which is connected to an inlet of filtration tower 1106. The suction in conduit 1112, in turn, draws the water/sediment 1004 mixture from the region encompassed by cofferdam structure 1002, through conduit 1112, and into filtration tower 1106. One or more filtering or separating devices (e.g., sieves, hydrocyclones, cross-flow filters, or conventional filters) within filtration tower 1106 act to separate the water/sediment 1004 mixture into a clean sediment component and a fluid component. The clean sediment component processed by filtration tower 1106 may be returned to a subsea environment via a further conduit 1114 connected to a sediment output of filtration tower 1106. The separated fluid component (e.g., water/oil mixture) may be removed from a fluid output of filtration tower 1106 via a further conduit 1116.

Conduit 1116 may then provide the fluid component to the one or more pressure vessels 1108 for further processing. Pressure vessels 1108 may then separate the fluid component into a first component including clean seawater and a second component containing oil. The first component including clean seawater may then be safely returned to a subsea environment via a water outlet of pressure vessels 1108, as described in greater detail below. The second component including oil may then be provided to the one or more bladder skids 1110 via one or more further conduits 1118. Various components of the system are described in greater detail below.

Figure 12A:
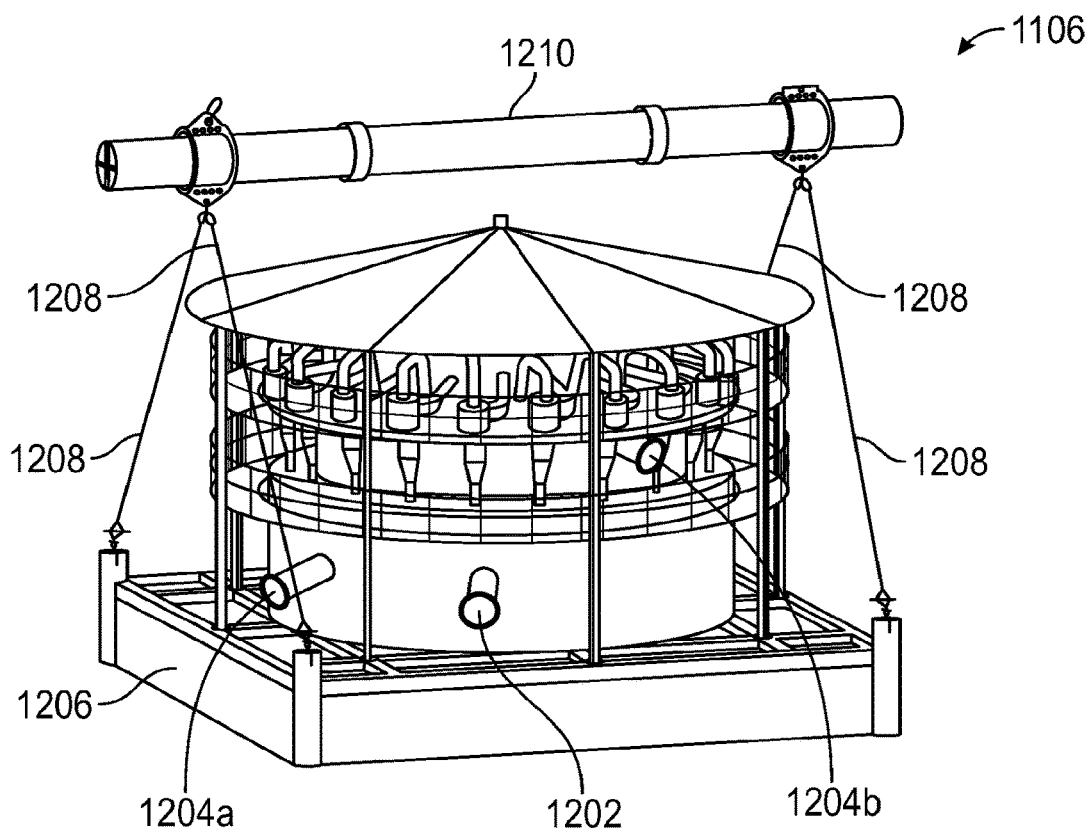
FIG. 12A is a three-dimensional perspective view of a filtration tower held by a lifting apparatus, according to an embodiment.

FIG. 12A is a three-dimensional perspective view of an exemplary filtration tower 1106 held by a lifting apparatus 1210, according to an embodiment. Filtration tower 1106 includes an inlet 1202 and first 1204a and second 1204b outlets. Inlet 1202 is configured to receive the water/sediment mixture which is drawn into filtration tower 1106 via pumps (not shown) within or external to the filtration tower 1106. Outlet 1204a is configured to provide the clean separated sediment component as output, and outlet 1204b is configured to provide the fluid component as output. As shown, filtration tower 1106 includes a platform 1206. In this example, platform 1206 measures 40 ft×40 ft. Other embodiments may include platforms having other dimensions suitable to other applications.

Filtration tower 1106 may be installed by connecting chains/cables 1208, etc., to platform 1206, as shown. Platform 1206 may then be lifted by a crane that may make a removable connection to lifting apparatus 1210. In this way, filtration tower 1106 may be lowered to a subsea surface, wherein platform 1206 may come to rest on the subsea surface.

Figure 12B:
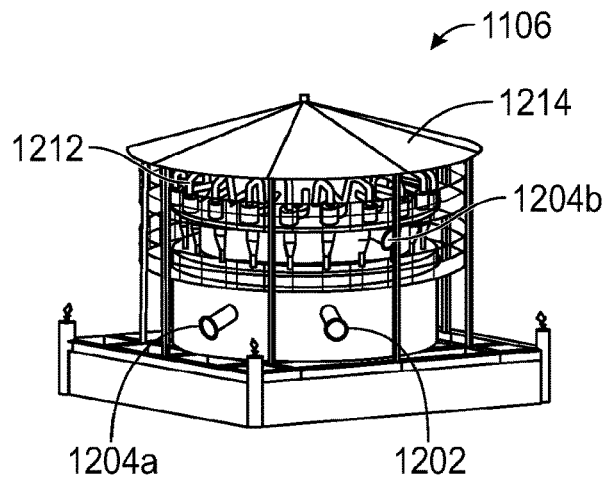
FIG. 12B is a first three-dimensional perspective view of the filtration tower of FIG. 12A in an installed configuration, according to an embodiment.
Figure 12C:
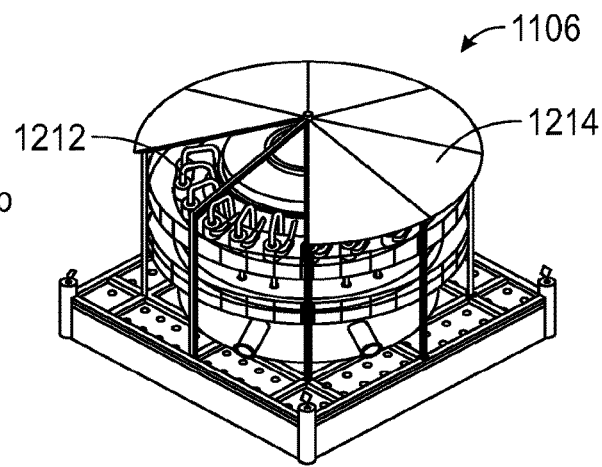
FIG. 12C is a second three-dimensional perspective view of the filtration tower of FIGS. 12A and 12B in an installed configuration, according to an embodiment.

FIGS. 12B and 12C show first and second three-dimensional perspective views of an example filtration tower 1106 in an installed configuration, according to an embodiment. FIG. 12B, for example, shows filtration tower 1106 in an exemplary orientation as if positioned on a subsea surface after being lowered to the subsea surface by lifting apparatus 1210 connected to chains/cables 1208, as described above (e.g., see FIG. 12A). As shown, filtration tower 1106 may include a plurality of filtering or separating devices 1212. Examples of filtering or separating devices include hydrocyclones, sieves, cross-flow filters, conventional filters, or other types of separation devices. Filtration tower 1106 may further include a pollution dome 1214. Pollution dome 1214 may be configured to collect any leaking oil from the environment surrounding filtration tower 1106.

FIG. 12C shows a cutaway view in which a portion of pollution dome 1214 has been removed. In this view of the example filtration tower 1106, the plurality of filtering or separating devices 1212 are shown. The plurality of filtering or separating devices 1212 may be configured to have parallel fluidic connections between inlet 1202 and outlets 1204a and 1204b. In this regard, inlet 1202 may provide the water/sediment mixture to inlets of each of the plurality of filtering or separating devices 1212 via parallel fluid connections. Similarly, outlets 1204a and 1204b may be connected via parallel fluidic connections to respective outlets of each of the plurality of filtering or separating devices 1212.

Figure 13:
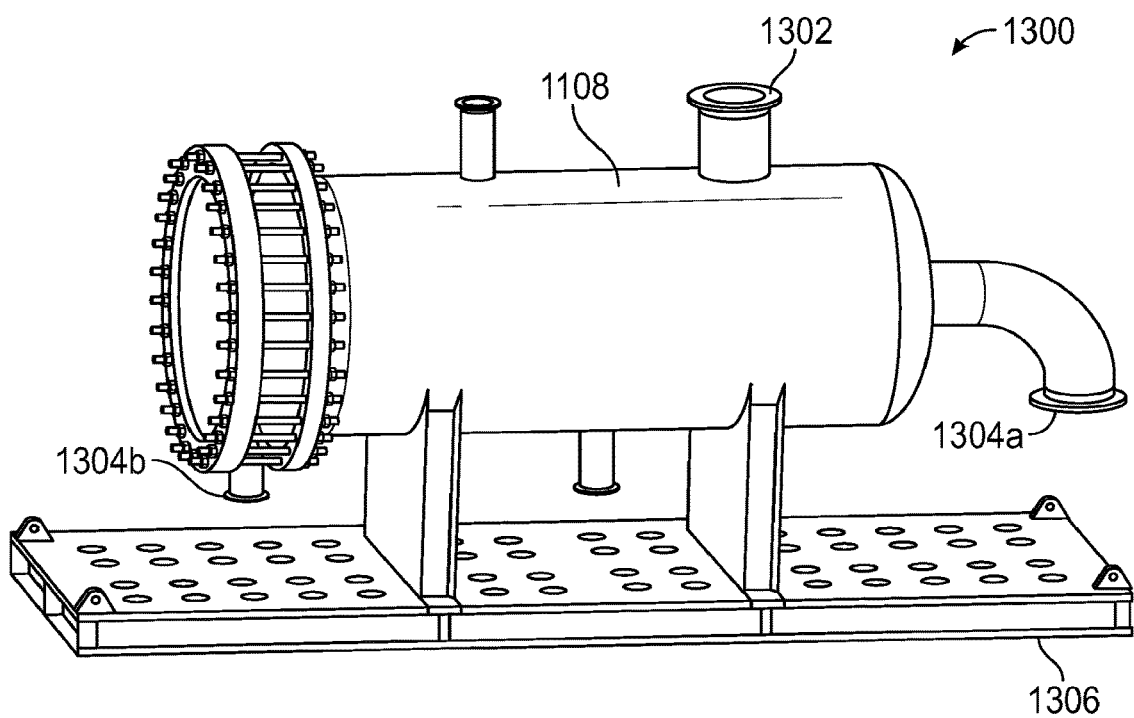
FIG. 13 is a second three-dimensional perspective view of a pressure vessel, according to an embodiment.

FIG. 13 is a three-dimensional perspective view of pressure vessel 1108, according to an embodiment. Pressure vessel 1300 includes an inlet 1302 and at least two outlets 1304a and 1304b. Inlet 1302 is configured to receive the oil/water mixture from filtration tower 1106 via conduit 1116 (e.g., see FIG. 11B), as described above. Pressure vessel 1300 includes a filtration or separation device (e.g., a high pressure hydrocyclone device) that separates the oil/water mixture into a first component, including cleaned seawater, and a second component, including separated oil. The cleaned seawater of the first component may be safely returned to a subsea environment of pressure vessel 1108 via outlet 1304a. The separated oil of the second component may be provided to conduits 1118 (e.g., see FIG. 11B) via outlet 1304b. As shown, pressure vessel 1300 may include a platform 1306. In this example, platform 1306 measures 9.5 ft×30 ft. Other embodiments may include platforms having other dimensions suitable to other applications.

Figure 14:
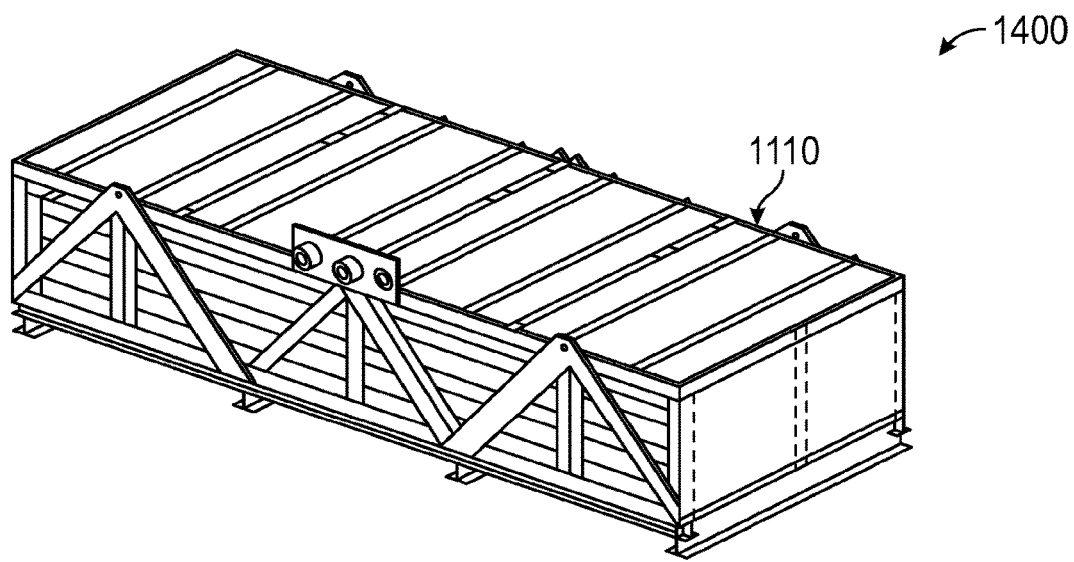
FIG. 14 is a three-dimensional perspective view of a bladder skid, according to an embodiment.

FIG. 14 is a three-dimensional perspective view 1400 of bladder skid 1110, according to an embodiment. Bladder skid 1110 may be configured to receive the separated oil component from pressure vessel 1108 that is provided by outlet 1304b (e.g., see FIG. 13) via conduit 1116 (e.g., see FIG. 11B). In this example, bladder skid measures 6 ft×15.5 feet. Other embodiments may include bladder skids having other dimensions suitable to other applications. Bladder skid 1110 may be configured to hold oil recovered by pressure vessel 1108. Oil held in bladder skid 1110 may then be transported topside by a ROV. Alternatively, various conduits or hoses may be connected to bladder skid 1110. Such conduits or hoses (not shown) may be used to transport oil from bladder skid 1110 to a topside vessel via one or more pumps.

Figure 15:
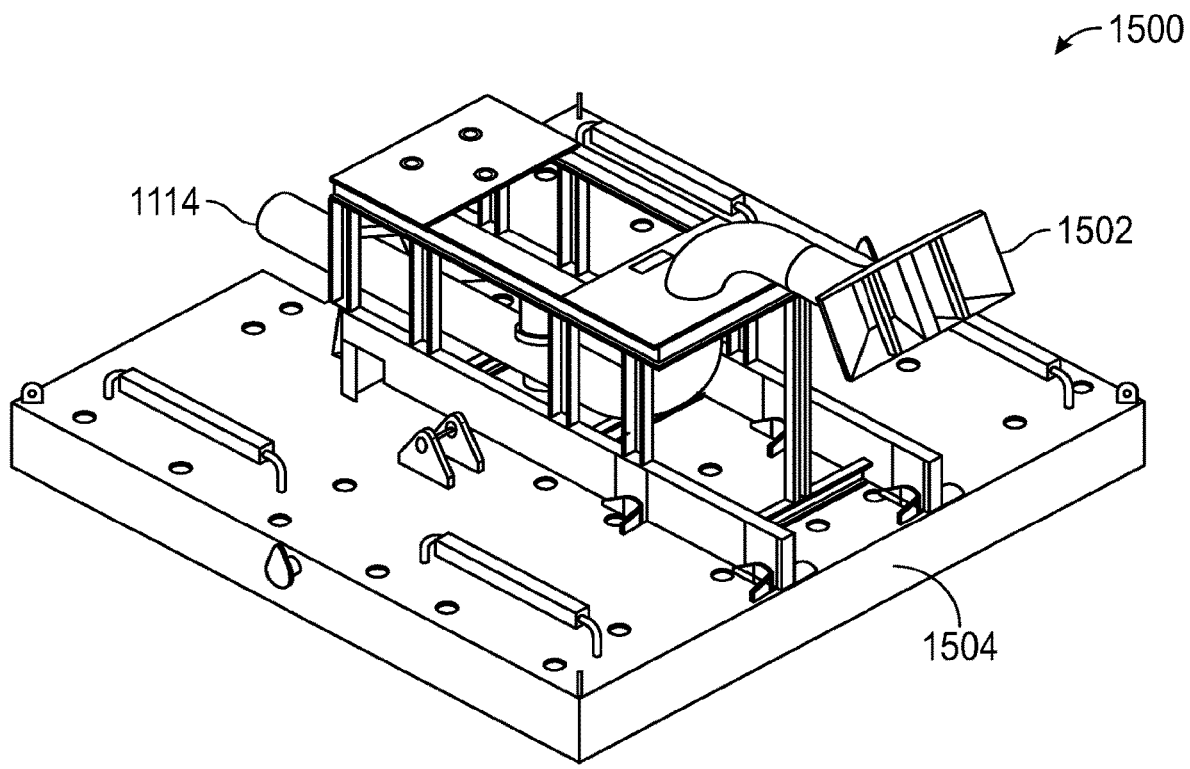
FIG. 15 is a three-dimensional perspective view of a spreader apparatus, according to an embodiment.

FIG. 15 is a three-dimensional perspective view of a spreader apparatus 1500, according to an embodiment. Spreader apparatus 1500 may be connected via conduit 1114 to outlet 1204a of filtration tower 1106 (e.g., see FIGS. 11B, 12A, and 12B). As such, spreader apparatus 1500 is configured to receive the clean sediment component from filtration tower 1106 and to disperse the clean sediment back to a subsea environment of spreader device 1500 via an outlet 1502. As shown, outlet 1502 may have a flared configuration, according to an embodiment. In this way, clean sediment may be dispersed over a range of angles determined by the shape and configuration of outlet 1502. In this example, spreader apparatus 1500 includes a platform 1504. In this example, platform 1504 measures 24 ft×24 ft. Other embodiments may include platforms having other dimensions suitable to other applications.

Figure 16:
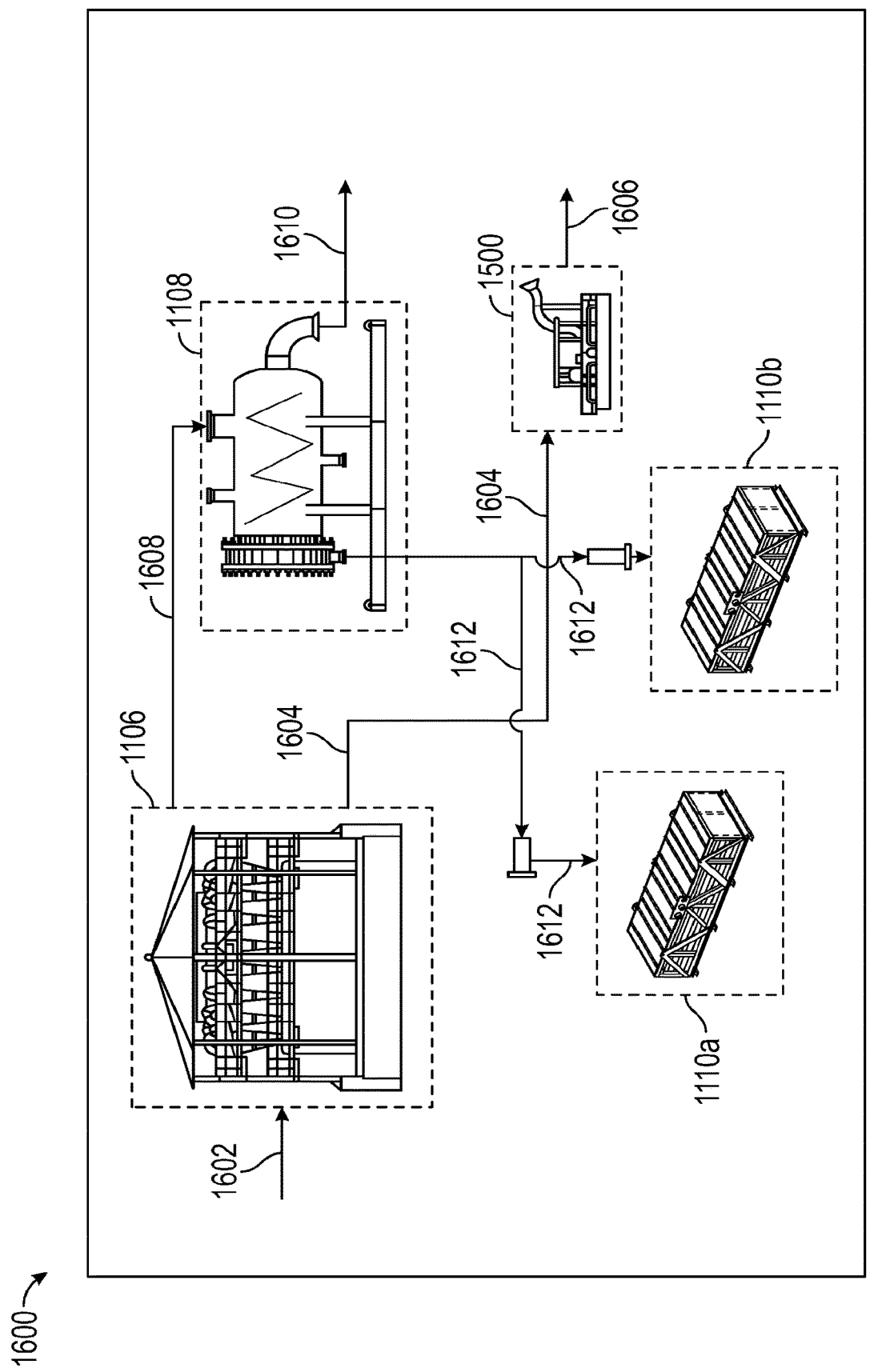
FIG. 16 is a process flow diagram for a subsea sediment separation and filtration system, according to an embodiment.

FIG. 16 is a process flow diagram 1600 for a subsea sediment separation and filtration system, according to an embodiment. As described above, the system includes filtration tower 1106, one or more pressure vessels 1108, one or more bladder skids 1110a and 1110b, and spreader apparatus 1500. The process begins by introducing a water/oil/sediment mixture into filtration tower 1106 along a first flow path 1602. Flow path 1602 may include, for example, conduits 1112, as illustrated in FIG. 11B. Filtration tower 1106 separates the water/oil/sediment mixture into a first component containing cleaned sediment and a second component containing a water/oil mixture. The first component containing the cleaned sediment is provided to spreader apparatus 1500 along a second flow path 1604. Flow path 1604 may include, for example, conduits 1114, as illustrated in FIGS. 11B and 15. Spreader apparatus 1500 then disperses the cleaned sediment back to the subsea environment via flow path 1606, which may include outlet 1502 (see FIG. 15).

The second component containing the water/oil mixture is provided to the one or more pressure vessels 1108 along flow path 1608. Flow path 1608 may include, for example, outlet 1204b, conduits 1116, and inlet 1302, as illustrated in FIGS. 11B, 12A, 12B, and 13. Pressure vessel 1108 then separates the water/oil mixture into a cleaned seawater component and an oil component. The cleaned seawater component is then returned to the subsea environment along flow path 1610. Flow path 1610 may include, for example, outlet 1304a, as illustrated in FIG. 13. The oil component is then provided to the one or more bladder skids 1110a and 1110b along flow path 1612. Flow path 1612 may include, for example, outlet 1304b and conduits 1118, as illustrated in FIGS. 11B and 13. The oil component may then be stored in bladder skids 1110a and 1110b. As described above, the oil component in bladder skids 1110a and 1110b may subsequently be recovered by an ROV or by pumping the oil from bladder skids 1110a and 1110b through various conduits/hoses to a topside vessel.

Figure 17:
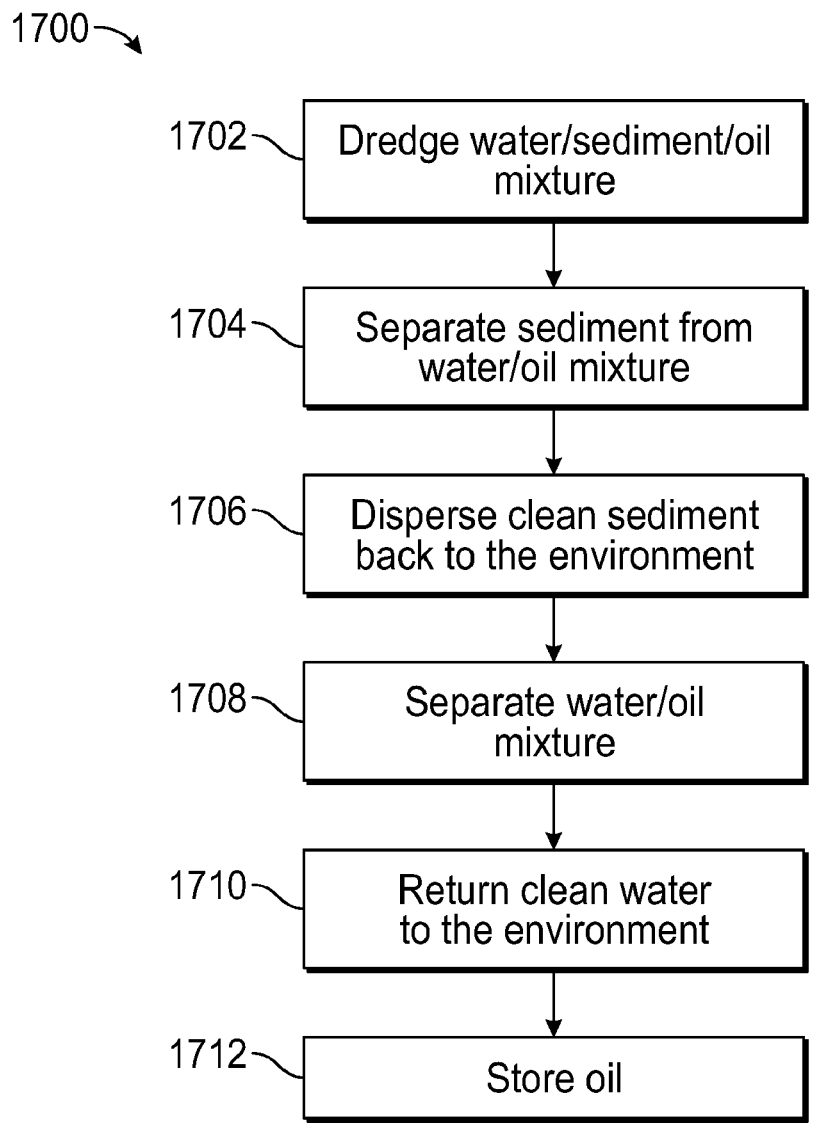
FIG. 17 is a flow chart illustrating a method of operating a subsea sediment separation and filtration system, according to an embodiment.

FIG. 17 is a flow chart 1700 illustrating a method of operating a subsea sediment separation and filtration system 1100 (e.g., see FIGS. 11A and 1B), according to an embodiment. In stage 1702, a mixture of water, sediment, and oil is dredged from a subsea sediment layer within a region encompassed by suction pile cofferdam 1002 (e.g., see FIG. 10). The mixture is then introduced to a filtration system such as filtration tower 1106 (e.g., see FIGS. 12A to 12C). In stage 1704, the method includes separating the mixture into a first component containing cleaned sediment and a second component containing an oil/water mixture. As described above, the separation in stage 1704 may be performed by filtration tower 1106. In stage 1706, the method includes dispersing the cleaned sediment of the first component back to the subsea environment. As described above, a spreader apparatus such as spreader apparatus 1500 (e.g., see FIG. 15) may be used to disperse the cleaned sediment.

In stage 1708, the method includes separating the second component containing the oil/water mixture into a cleaned seawater component and an oil component. As described above, the separation of stage 1708 may be performed by one or more pressure vessels 1108a and 1108b (e.g., see FIGS. 13 and 16). In stage 1710, the method includes returning the cleaned seawater component to the subsea environment. As described above, stage 1710 may be performed by returning the cleaned seawater component to the subsea environment through an outlet (e.g., outlet 1304a in FIG. 13) of the one or more pressure vessels 1108 (e.g., see FIGS. 13 and 16). In stage 1712, the method includes storing the separated oil component. As described above, the separated oil component may be stored in one or more bladder skids 1110a and 1110b (e.g., see FIGS. 14 and 16).

Figure 18:
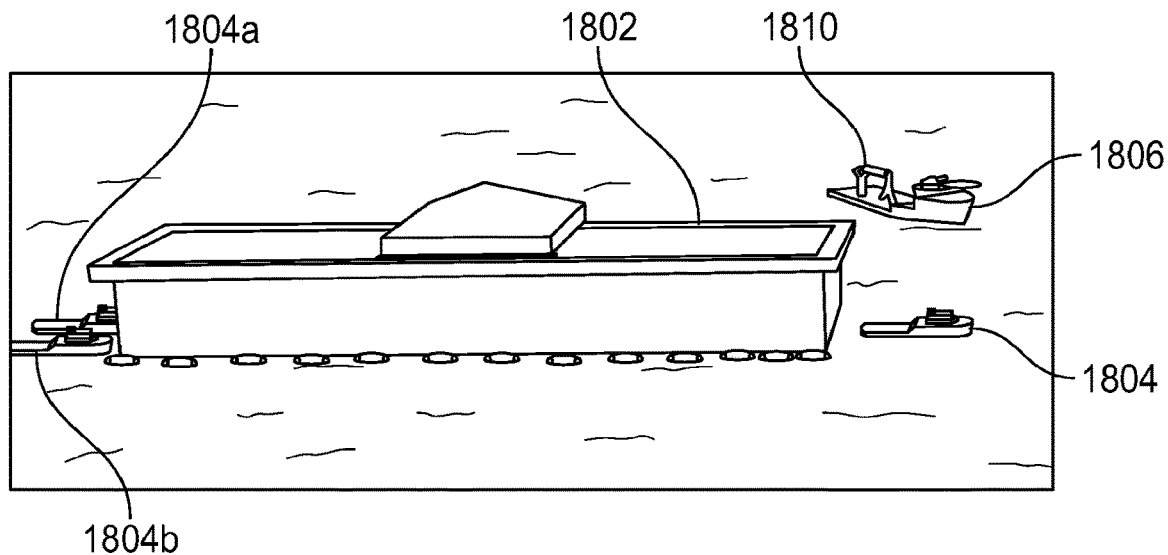
FIG. 18 is a first three-dimensional perspective view of a cofferdam being positioned topside, according to an embodiment.
Figure 19:
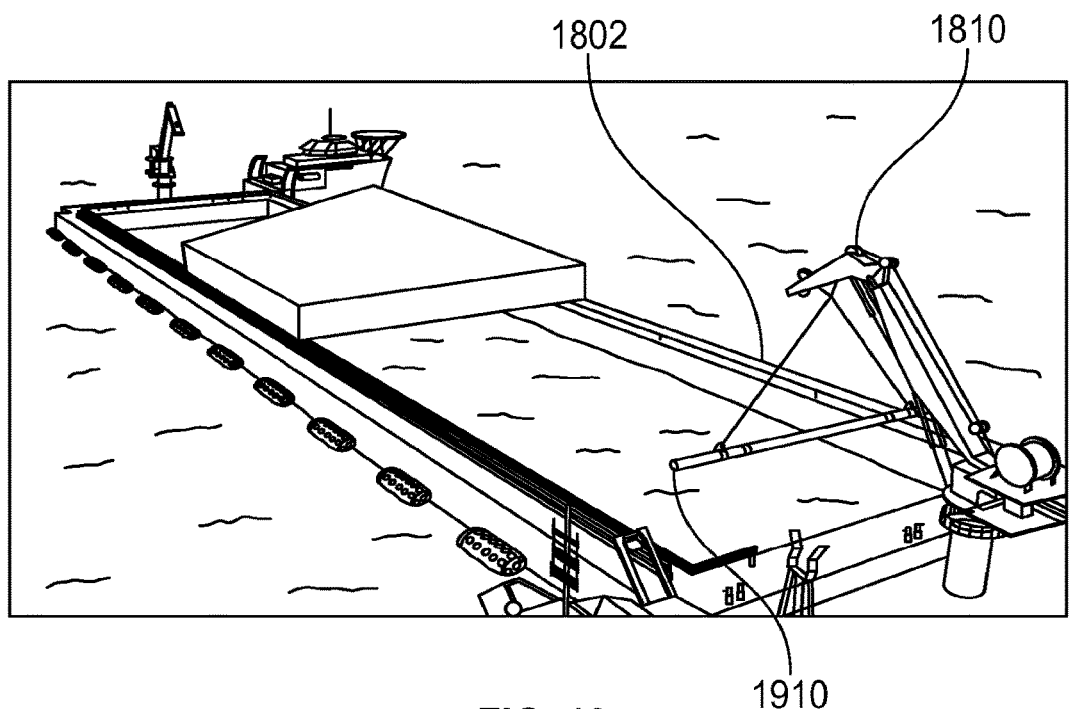
FIG. 19 is a second three-dimensional perspective view of a cofferdam being positioned topside, according to an embodiment.
Figure 20:
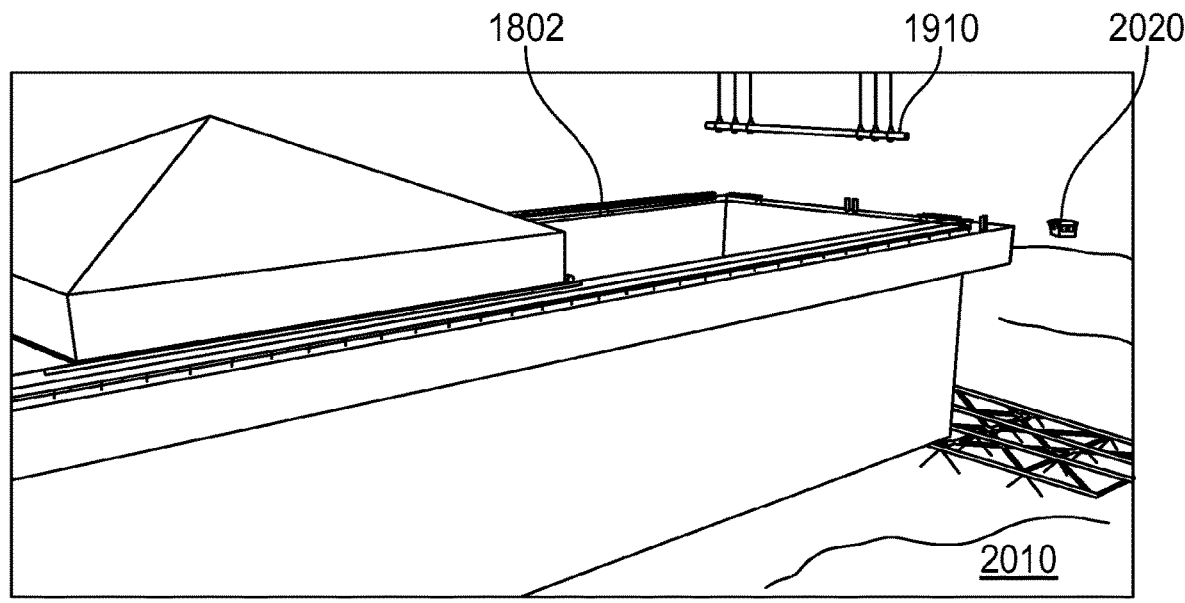
FIG. 20 is a three-dimensional perspective view of a cofferdam being positioned on a subsea surface, according to an embodiment.
Figure 21:
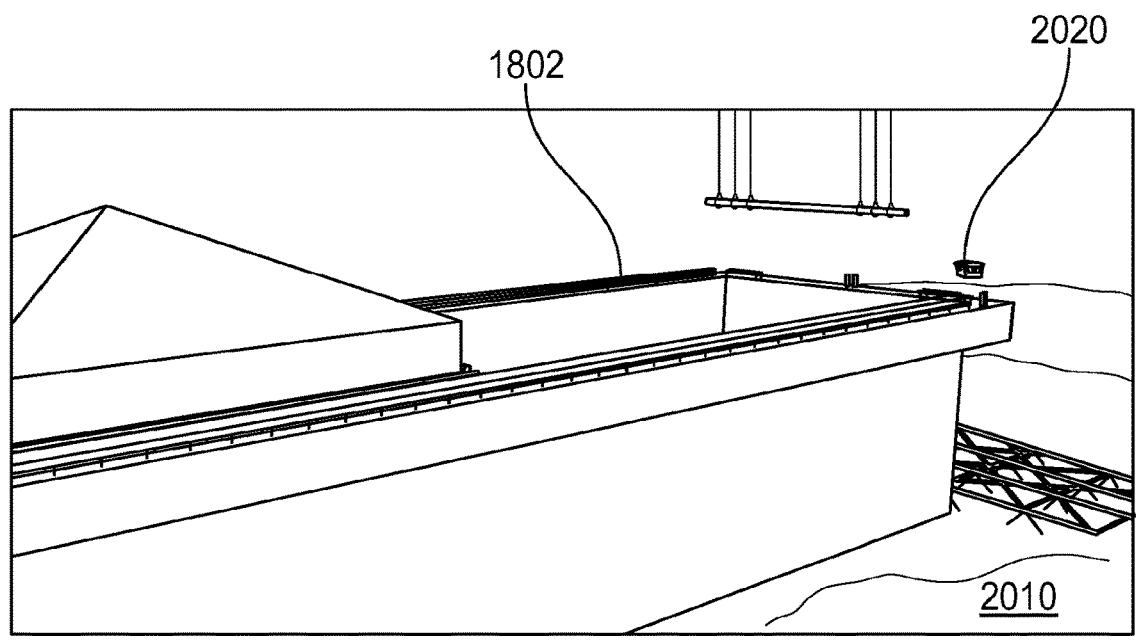
FIG. 21 is a three-dimensional perspective view of a cofferdam after sinking into subsea sediment under its own weight, according to an embodiment.

FIGS. 18 to 21 further illustrate a process of installing a cofferdam, according to an embodiment. In FIG. 18, a cofferdam 1802, which may be an example of the cofferdam 100 illustrated FIG. 1, is propelled to a desired location by vessels 1804. A vessel 1806 with a crane 1810 is also shown. In FIG. 19, water is being allowed to enter the hollow walls of the cofferdam 1802, which has settled to a lower position in the water. Crane 1810 is attached to lift apparatus 1910 in preparation for controlling the position of cofferdam 1802 while cofferdam 1802 is lowered to a subsea surface. In FIG. 20, cofferdam 1802 is near to the seafloor 2010, and a lateral position of the cofferdam is being controlled by means of the lift apparatus 1910. An ROV 2020 is approaching the cofferdam 1802. In FIG. 21, the cofferdam 1802 is resting on the seafloor 2010, and the ROV 2020 is preparing to connect fluid connections to fluidic conduits of the cofferdam.

Figure 22:
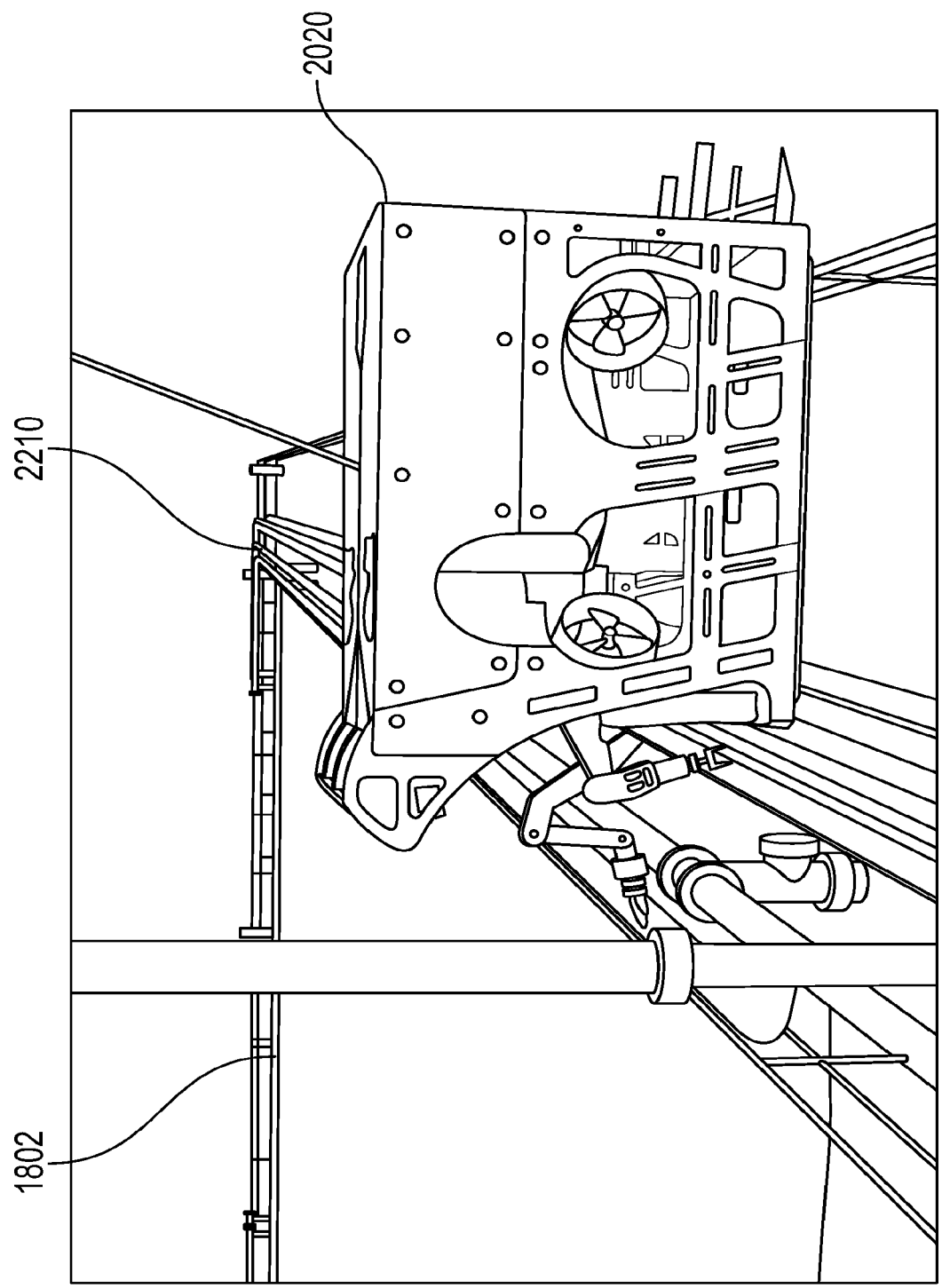
FIG. 22 is a three-dimensional perspective view of an ROV attaching hoses to fluidic conduits on cofferdam, according to an embodiment.

FIG. 22 illustrates an ROV 2020 making fluidic connections to the fluidic conduits 2210 of the cofferdam, which may be examples of the fluid conduits 408 (see FIG. 4), according to an embodiment.

Figure 23:
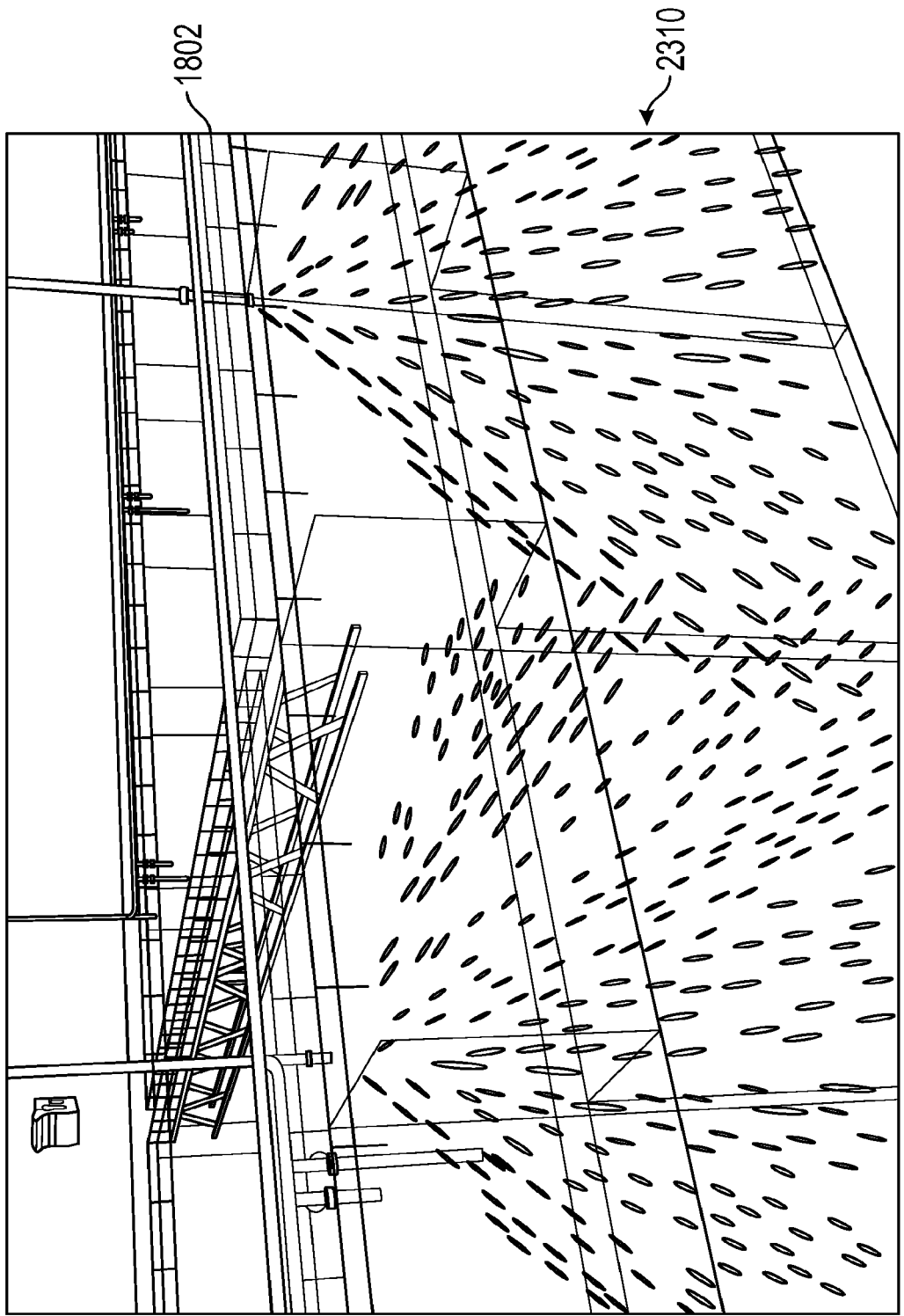
FIG. 23 is a three-dimensional perspective transparent view illustrating fluid being drawn from the cofferdam through the fluidic conduits, according to an embodiment.

FIG. 23 illustrates fluid 2310 being removed from the walls of the cofferdam 1802, according to an embodiment.

Figure 24:
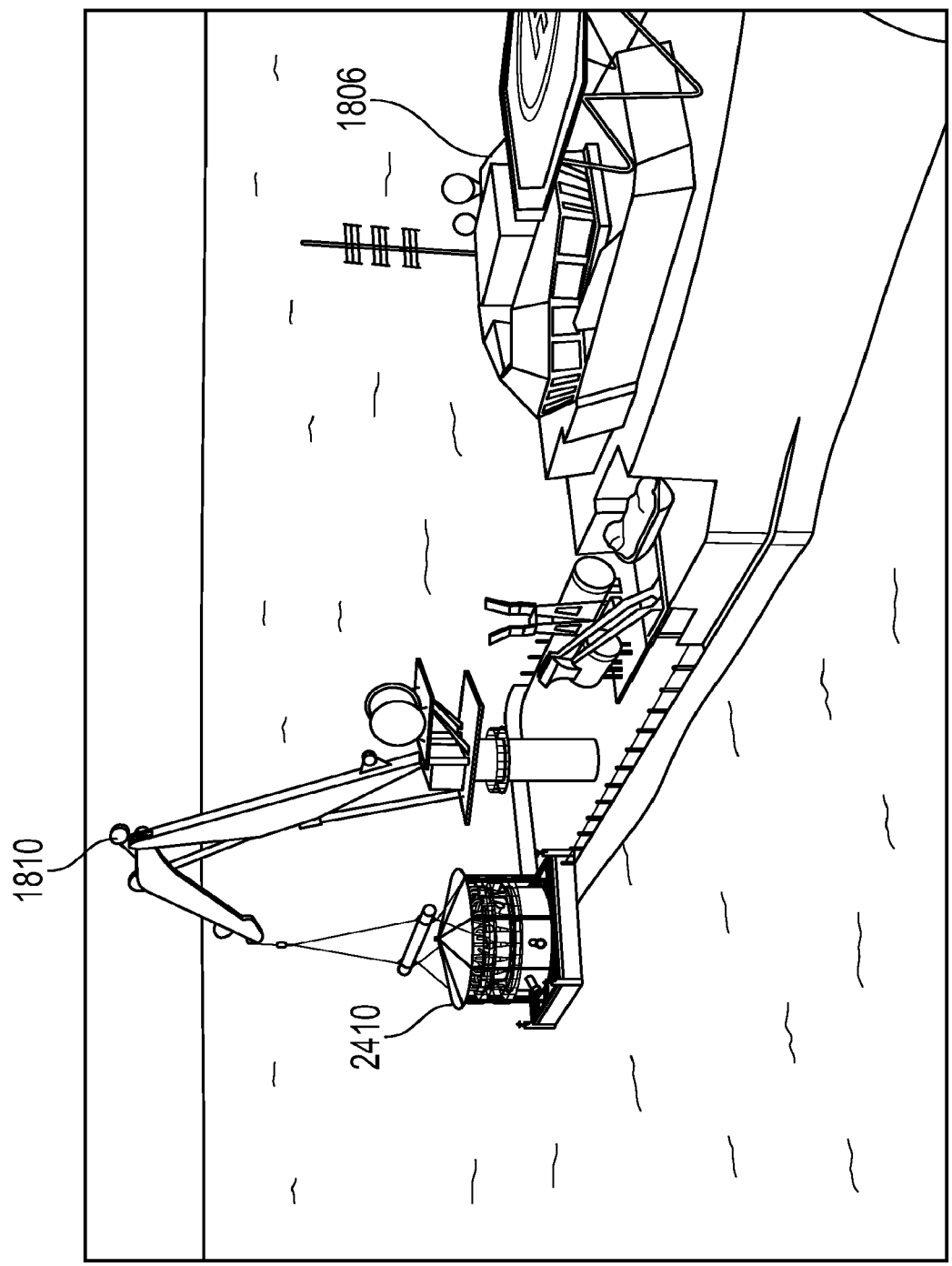
FIG. 24 is a three-dimensional perspective view of a filtration tower being lowered into the ocean by a crane on a topside vessel, according to an embodiment.
Figure 25:
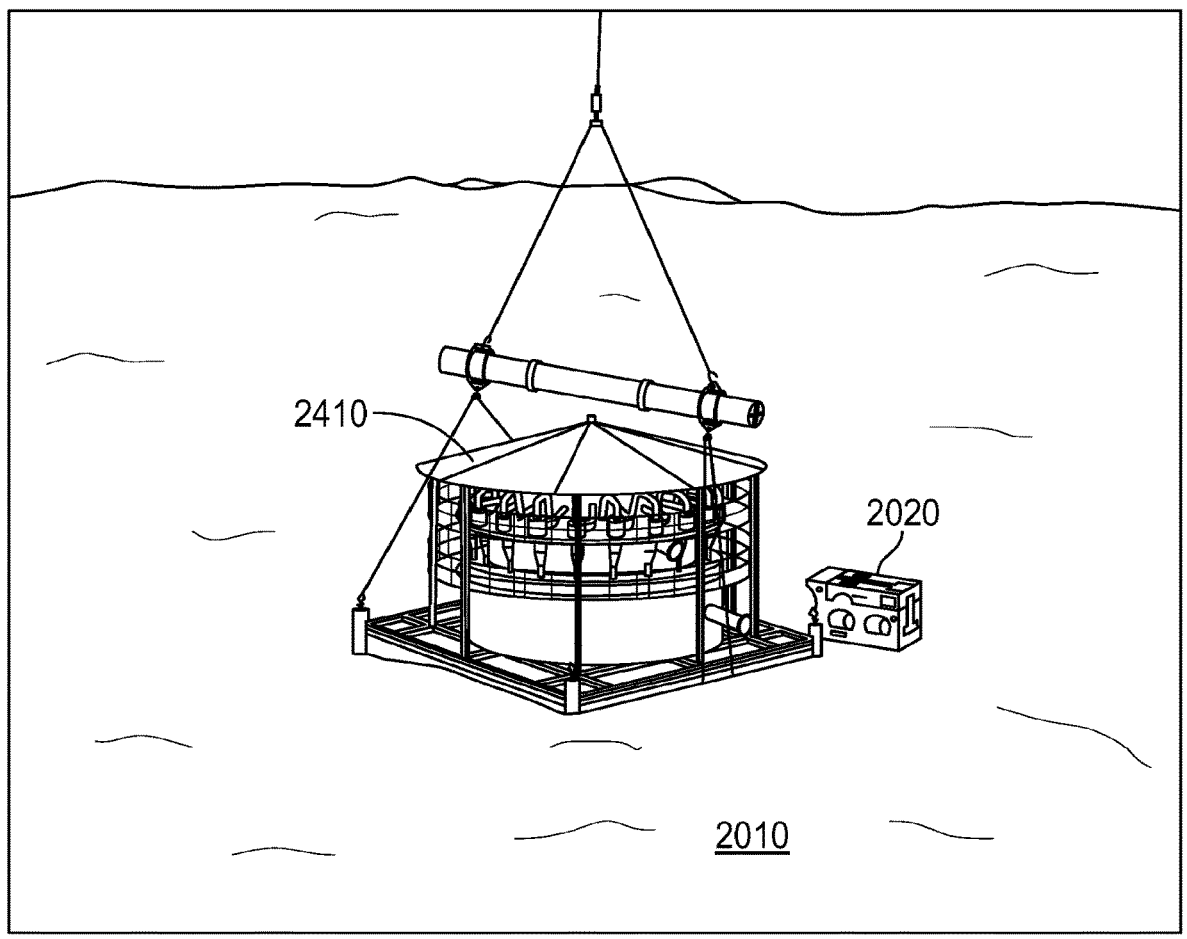
FIG. 25 is a three-dimensional perspective view of the filtration tower of FIG. 24 being positioned on a subsea surface, according to an embodiment.

FIGS. 24 and 25 illustrates a filtration tower 2410 of a subsea sediment separation and filtration system (e.g., subsea sediment separation and filtration system 1100) being lowered into the ocean by a crane 1810 on a topside vessel 1806, according to an embodiment. Filtration tower 2410 may be an example of filtration tower 1106, illustrated in FIG. 11. In FIG. 25, filtration tower 2410 is resting on the seafloor 2010, and ROV 2020 is preparing to connect fluid connections to the inlets and outlets of the filtration tower.

Figure 26:
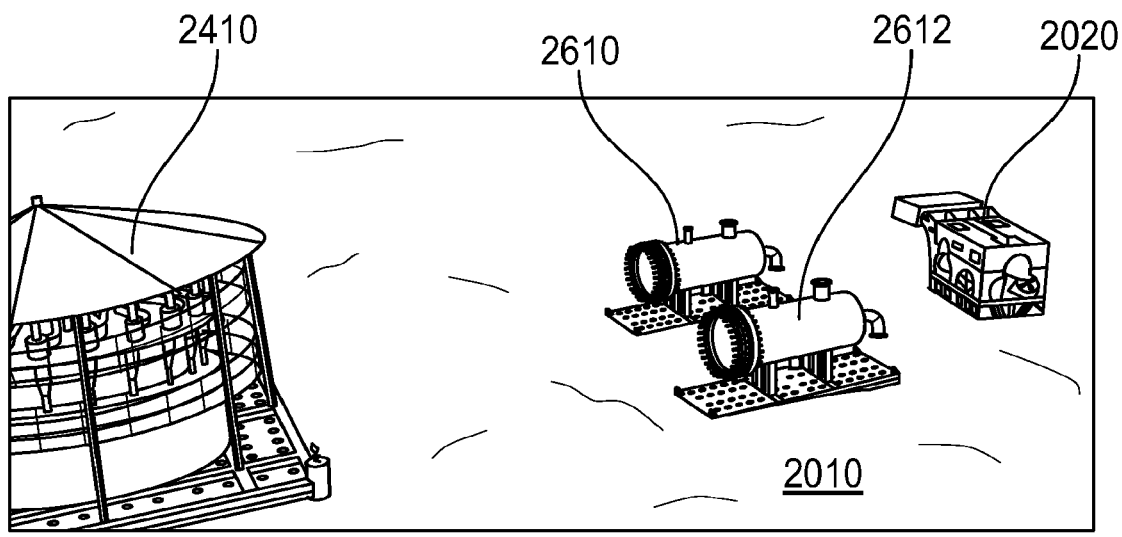
FIG. 26 is a three-dimensional perspective view of pressure vessels and bladder skids being positioned on a subsea surface, according to an embodiment.
Figure 27:
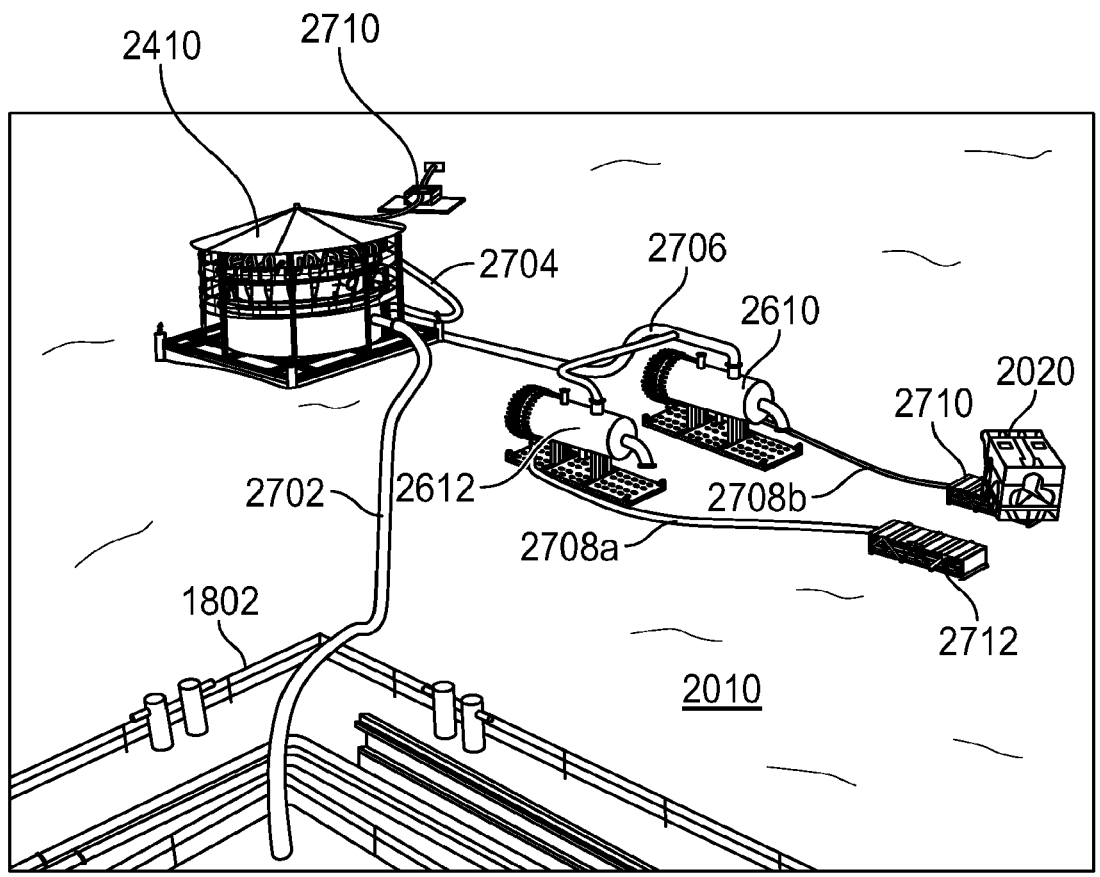
FIG. 27 is a three-dimensional perspective view of the components of the subsea sediment separation and filtration system in an assembled configuration with fluidic conduits connecting various components, according to an embodiment.

FIGS. 26 and 27 illustrate additional components of the subsea sediment separation and filtration system, and the subsea sediment separation and filtration system being assembled, respectively, according to an embodiment. In FIG. 26, pressure vessels 2610 and 2612, which may be examples of pressure vessel 1108 (see FIG. 11), are positioned on the sea floor 2010 near filtration tower 2410, and ROV 2020 is preparing to connect fluid connections from the filtration tower 2410 to the pressure vessels 2610 and 2612. In FIG. 27, a conduit 2702 (which may be an example of conduit 1112, see FIG. 11B) enables a water/oil/sediment mixture to be pumped from an interior of the cofferdam 1802 to the filtration tower 2410. Conduit 2704 (which may be an example of conduit 1114, see FIG. 11B) enables sediment to be pumped to a spreader apparatus 2710, which may be an example of spreader apparatus 1500 (see FIG. 15). Conduit 2706, which may be an example of conduit 1116 (see FIG. 11B), enables an oil and water mixture to be pumped from the filtration tower 2410 to the pressure vessels 2610 and 2612. Conduits 2708, which may be examples of conduit 1118 (see FIG. 11B), enable an oil mixture to be pumped from each of the pressure vessels 2610 and 2612 to skid bladders 2710 and 2712.

Figure 28:
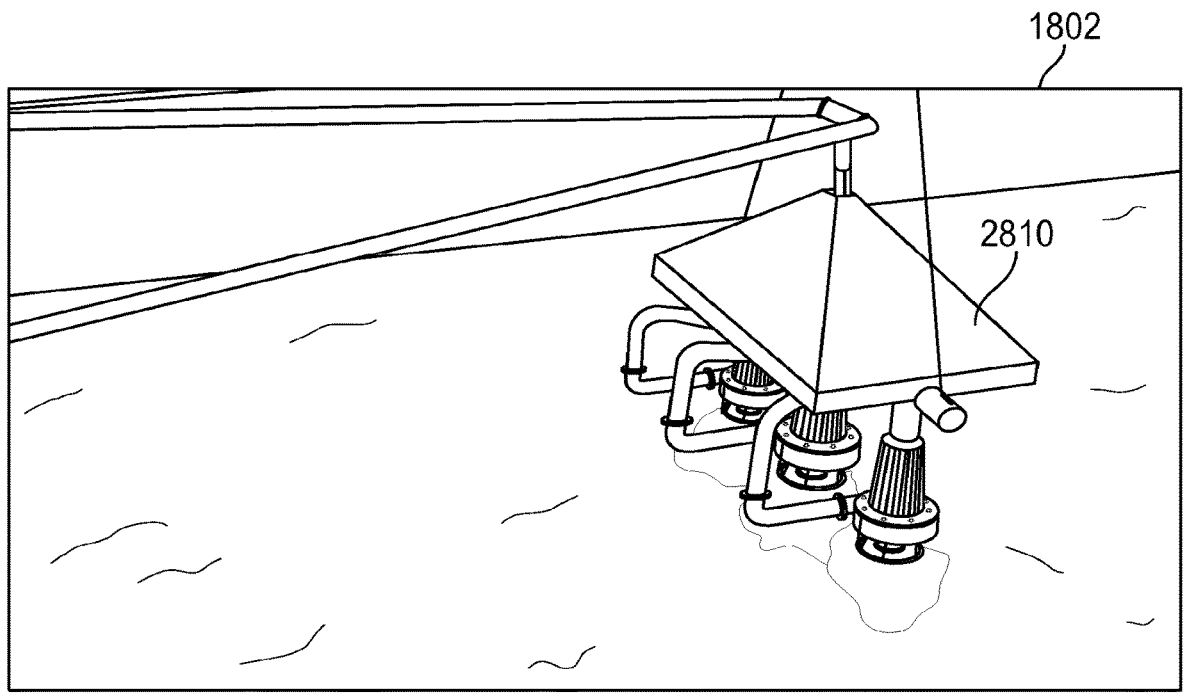
FIG. 28 is a three-dimensional perspective view of a suction system that draws water and sediment out of a region encompassed by the cofferdam, according to an embodiment.

FIG. 28 illustrates a suction device 2810 configured to remove water and sediment and to provide the removed water and sediment to the filtration tower 2410 of the separation and filtration system, according to an embodiment.

Figure 29:
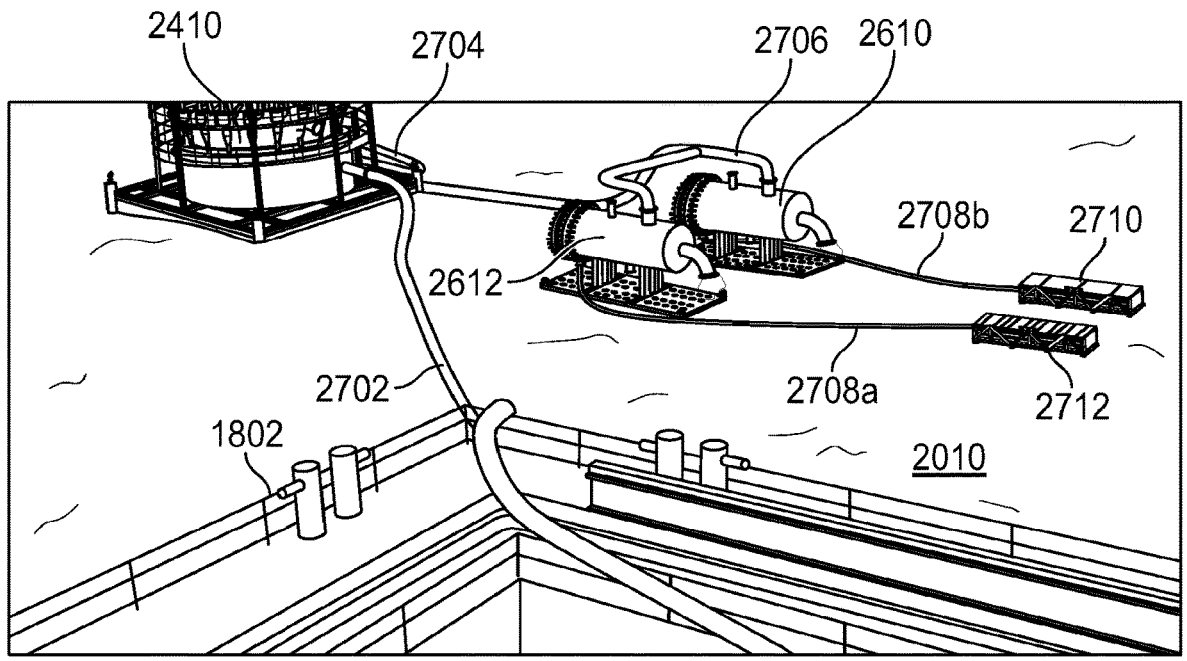
FIG. 29 is a three-dimensional perspective view of the subsea sediment separation and filtration system, according to an embodiment.

FIG. 29 provides a further view of the subsea sediment separation and filtration system in an operational state, according to an embodiment. As described herein, sediment and polluted water are pumped from the interior of the cofferdam 1802 to the filtration tower 2410. Sediment is pumped to a spreader apparatus (see FIG. 27) via a conduit 2704. An oil and water mixture is pumped to pressure vessels 2610 and 2612 via the conduit 2706. The oil and water mixture are separated by the pressure vessels 2610 and 2612, and clean water is returned to the ocean. Oil is pumped from the pressure vessels 2610 and 2612 via conduits 2708 to skid bladders 2710 and 2712.

Figure 30:
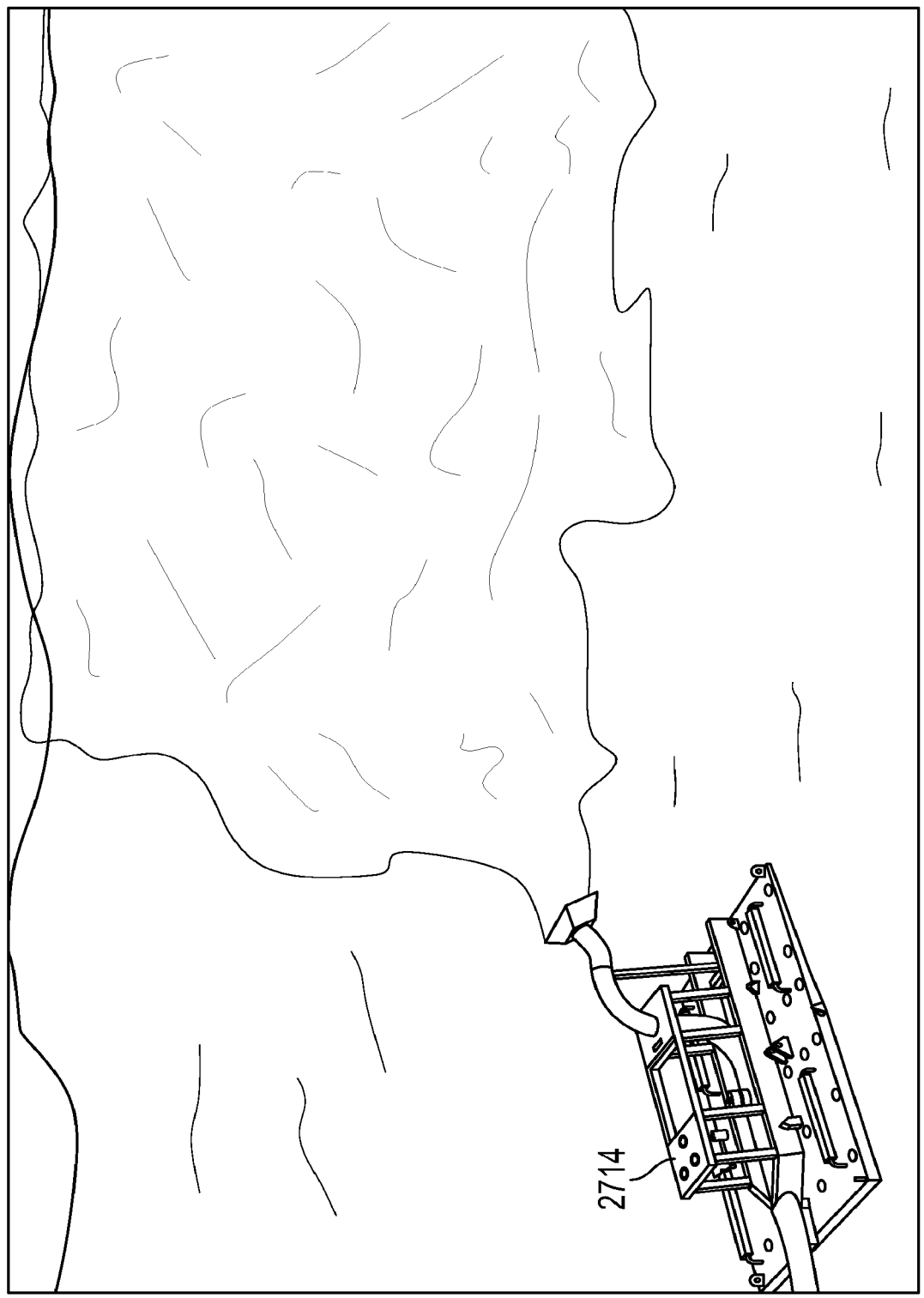
FIG. 30 is a three-dimensional perspective view of an operating sediment sprayer device, according to an embodiment.

FIG. 30 illustrates a sediment sprayer 2714 in an operational state, according to an embodiment.

Figure 31:
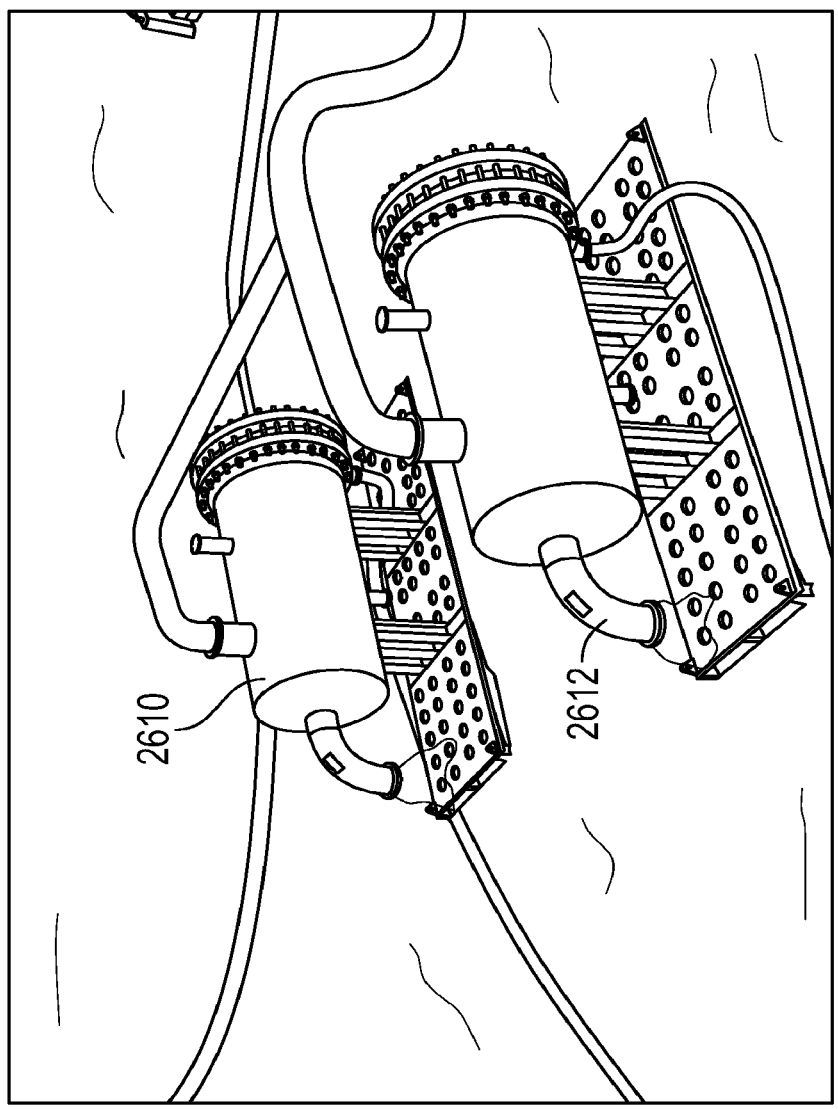
FIG. 31 is a three-dimensional perspective view of an operating pressure vessel, according to an embodiment.
Figure 32:
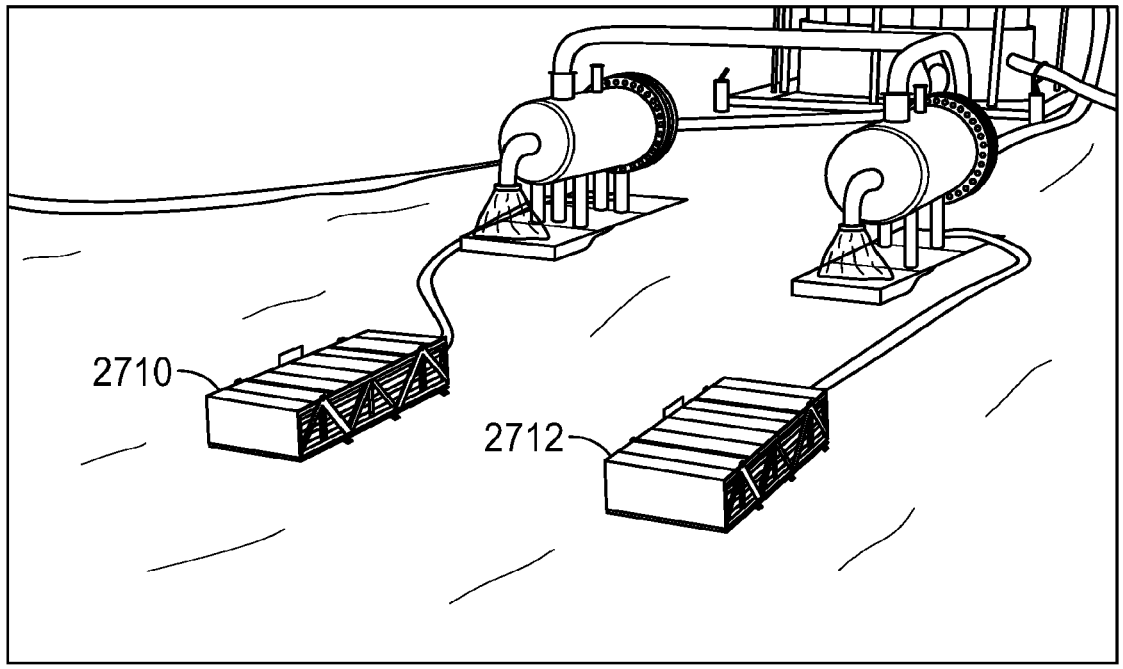
FIG. 32 is a three-dimensional perspective view of bladder skids in operation, according to an embodiment.

FIGS. 31 and 32 show close up views of the pressure vessels 2610 and 2612 and bladder skids 2710 and 2712, respectively, according to embodiments.

Figure 33:
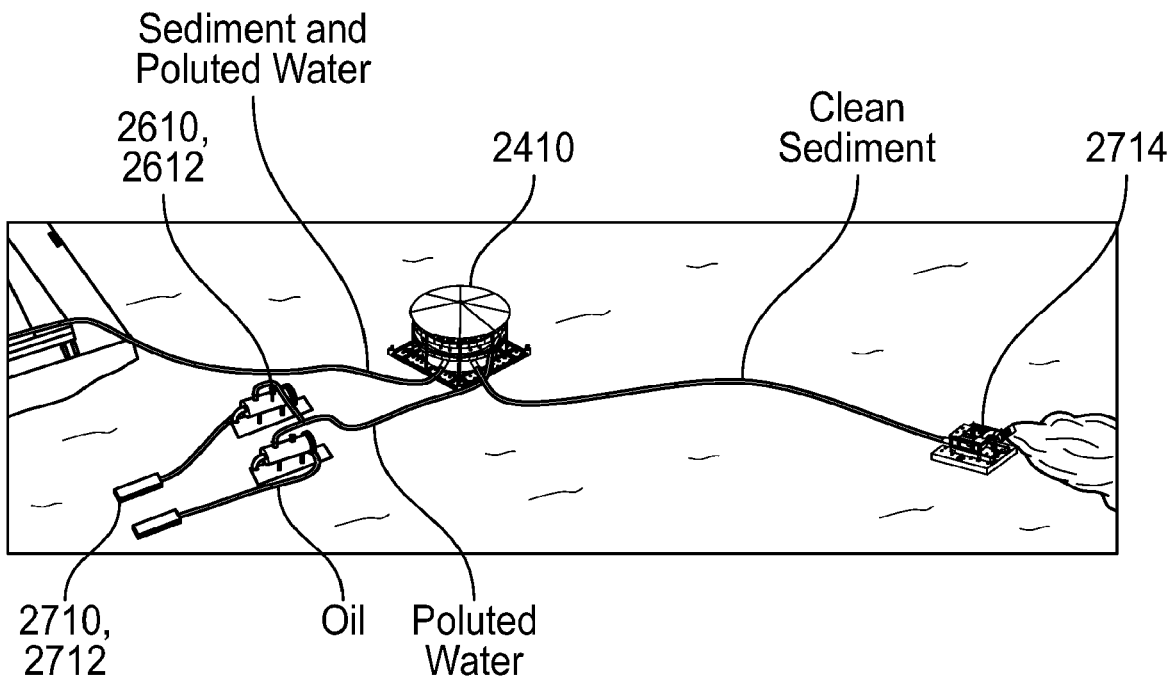
FIG. 33 is a further three-dimensional perspective view of the components of the subsea sediment separation and filtration system in an assembled configuration with fluidic conduits connecting various components, according to an embodiment.

FIG. 33 illustrates a further view of the complete subsea sediment separation and filtration system in an operational state, according to an embodiment.

Figure 34:
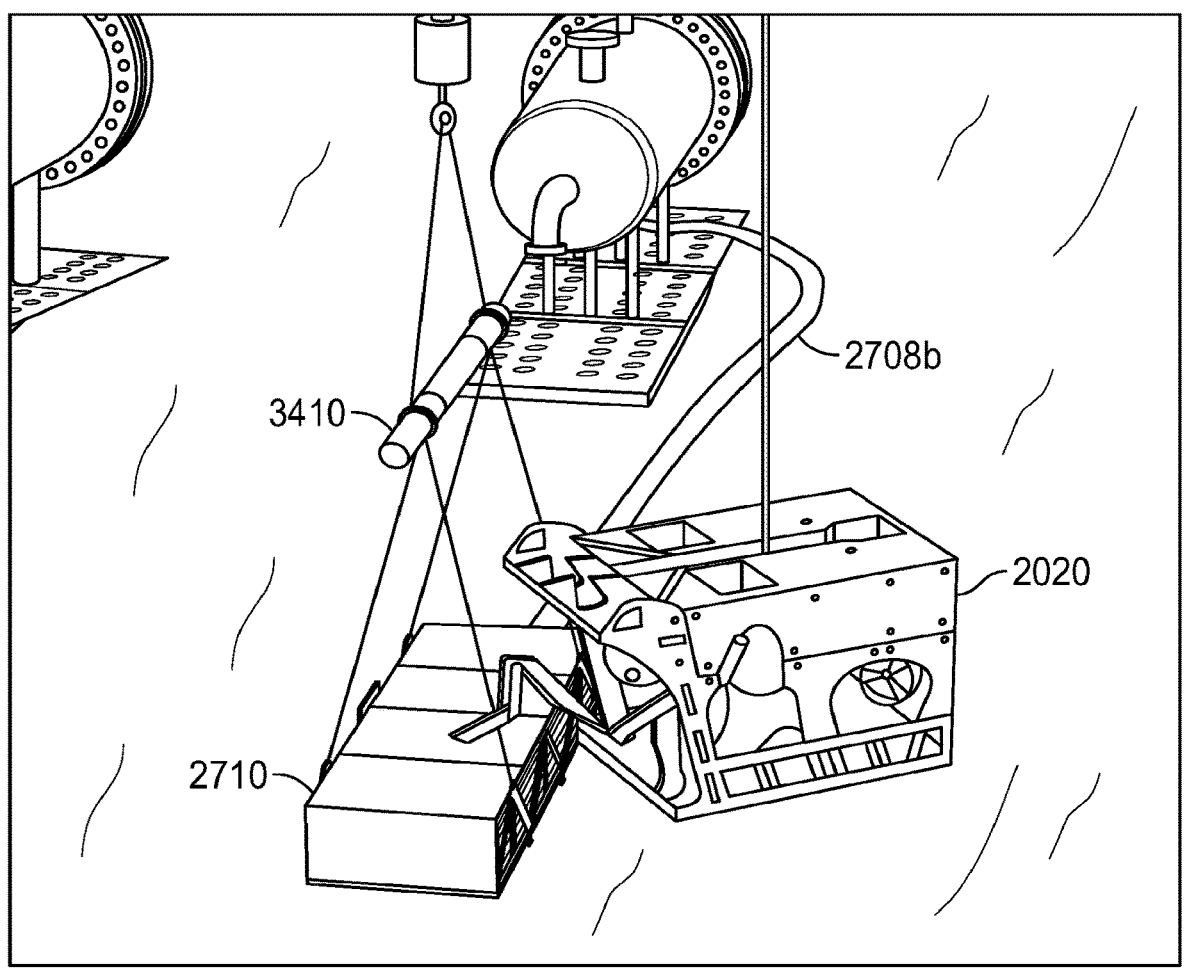
FIG. 34 is a three-dimensional perspective view of a bladder skid being attached to a crane, according to an embodiment.
Figure 35:
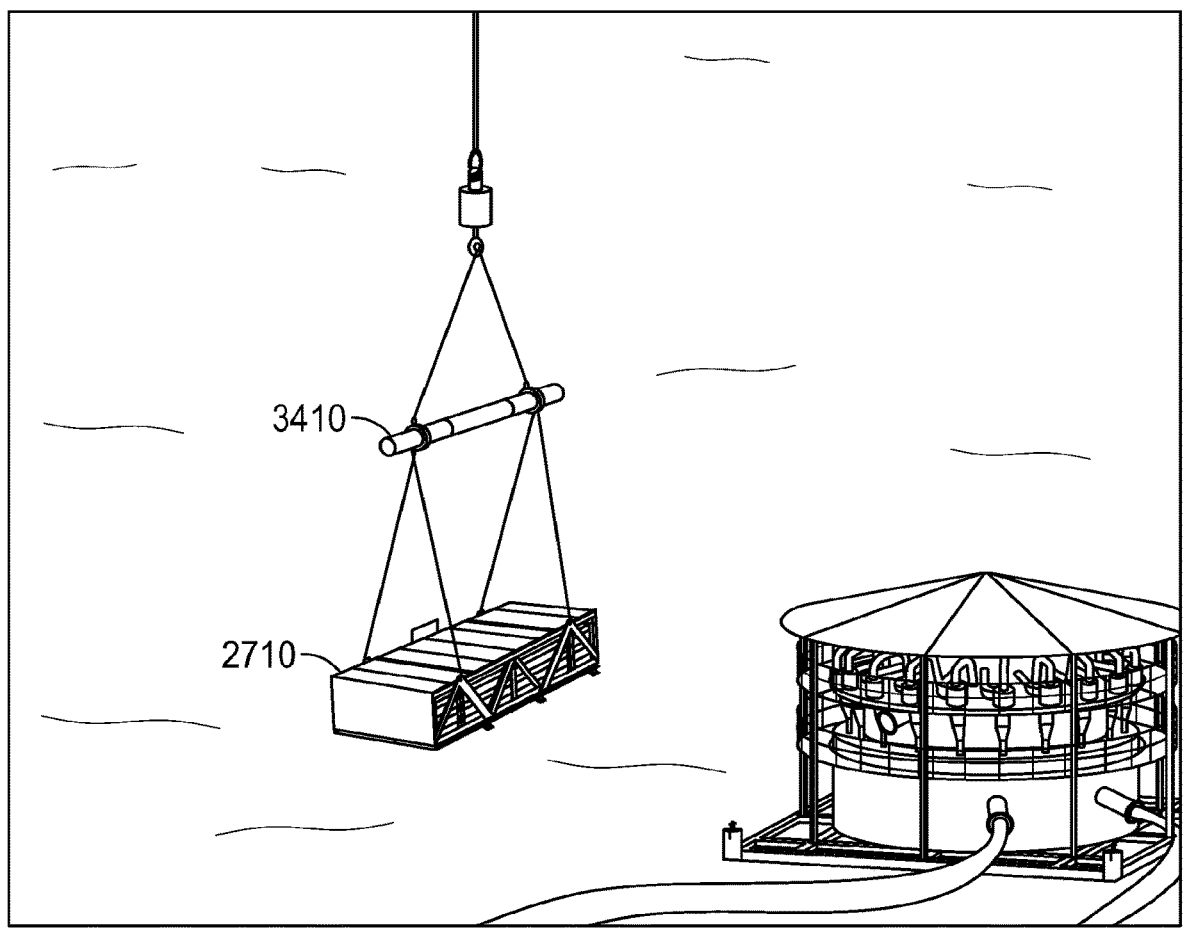
FIG. 35 is a three-dimensional perspective view of a bladder skid being raised to a topside vessel by a crane, according to an embodiment.

FIGS. 34 and 35 show a bladder skid being lifted by a crane to a topside vessel for removal of oil, according to an embodiment. In FIG. 34, ROV 2020 is attaching a lifting apparatus 3410 to bladder skid 2710 and detaching conduit 2708a from bladder skid 2710, in preparation for bladder skid being lifted by the topside vessel (not shown). In FIG. 35, bladder skid 2710 is being lifted.

Figure 36:
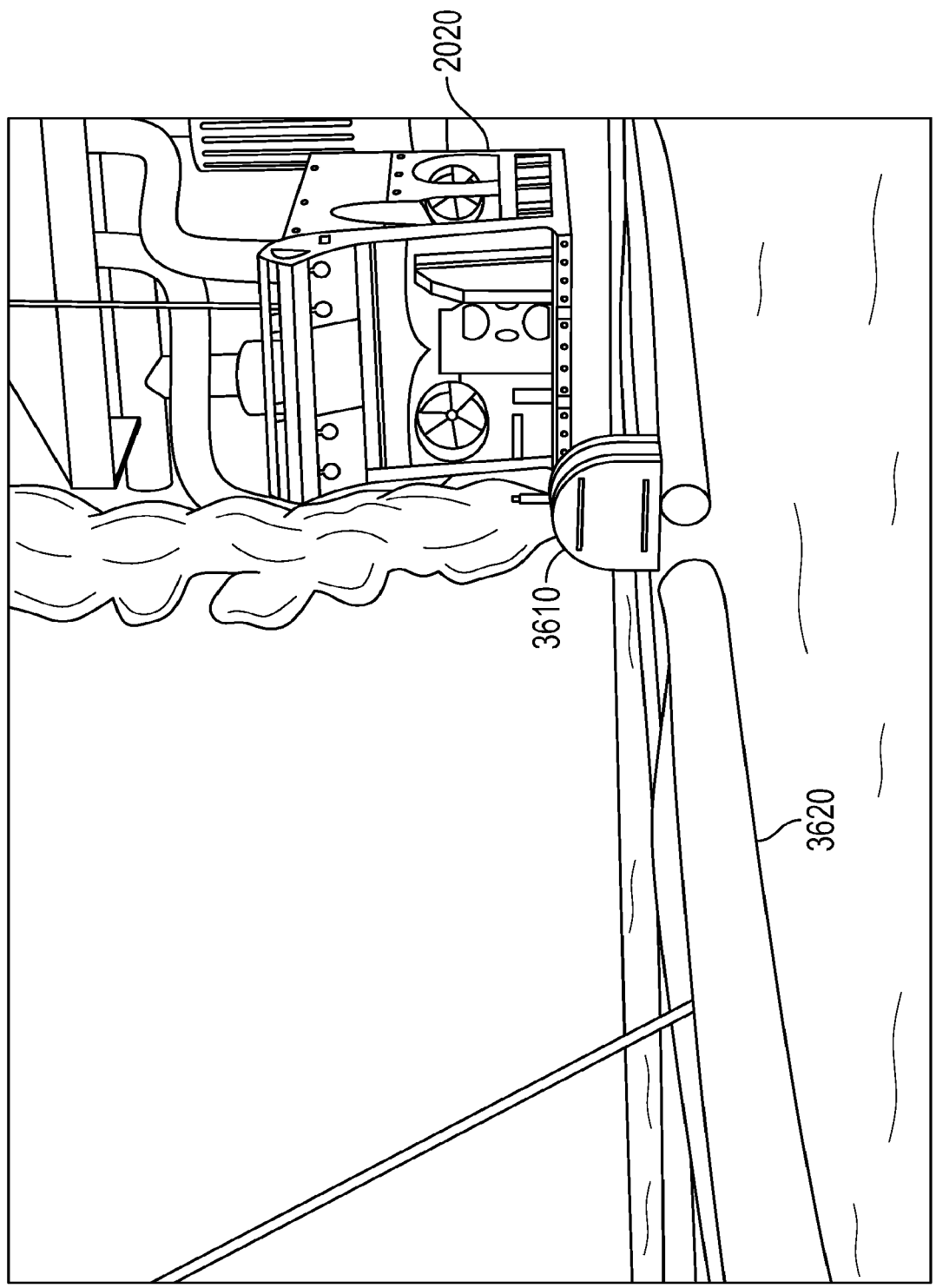
FIG. 36 is a three-dimensional perspective view of an ROV cutting a damaged pipe, according to an embodiment.

FIG. 36 illustrates a ROV 2020 controlling a saw 3610 to cut a damaged pipe 3620 that has been exposed by operation of the suction device, according to an embodiment.

Figure 37:
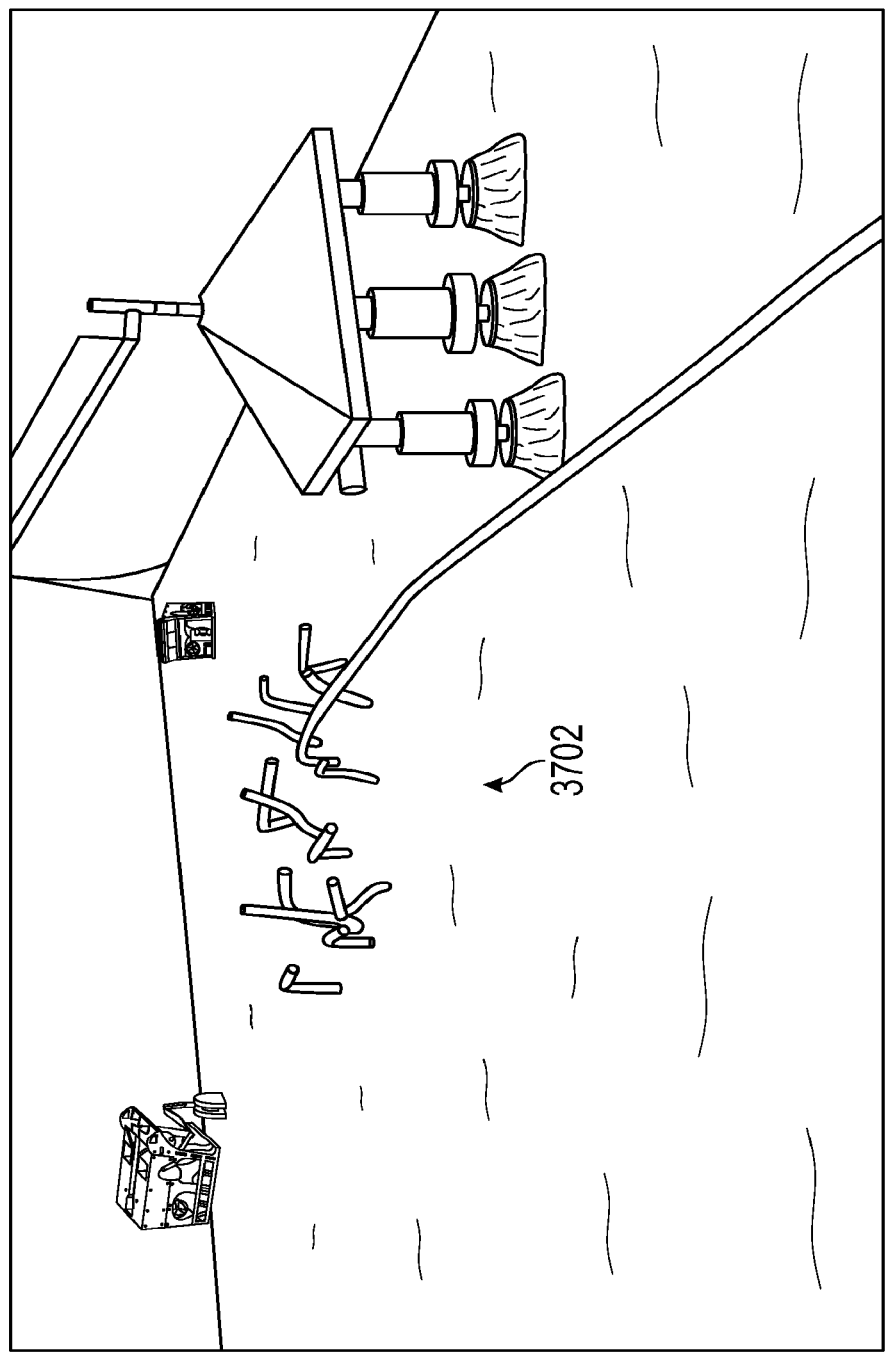
FIG. 37 is a three-dimensional perspective view of an ROV cutting a plurality of damaged pipes, according to an embodiment.

FIG. 37 illustrates multiple damaged pipes 3702 that have been cut in preparation for further repair, according to an embodiment. In one example, the level can be ~–100' below M/L.

Figure 38:
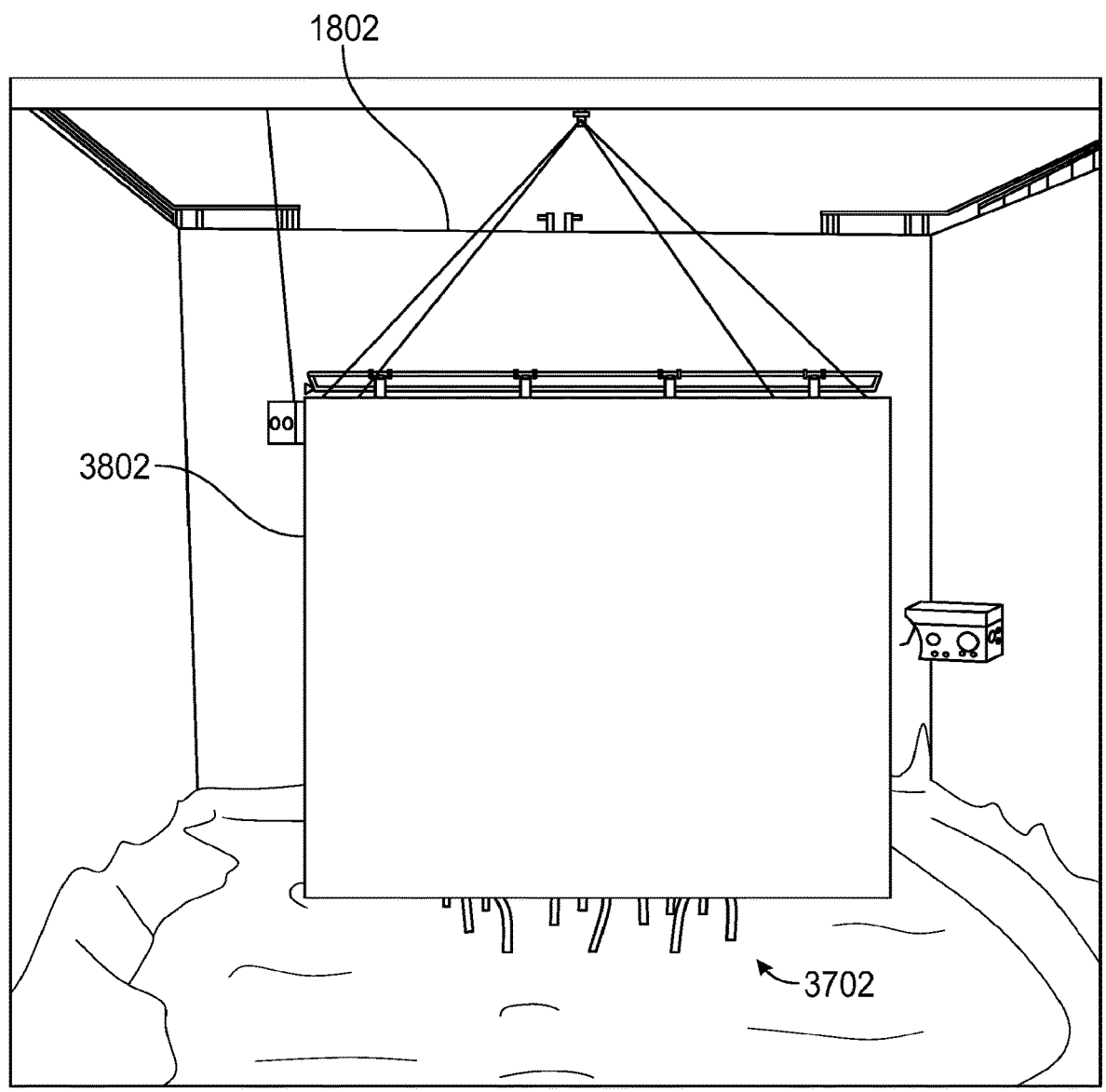
FIG. 38 is a three-dimensional perspective view of a smaller cofferdam being lowered over the plurality of damaged pipes, according to an embodiment.

FIG. 38 illustrates a smaller cofferdam 3802 being installed within the larger cofferdam 1802 and around the damaged pipes 3702, according to an embodiment.

Figure 39:
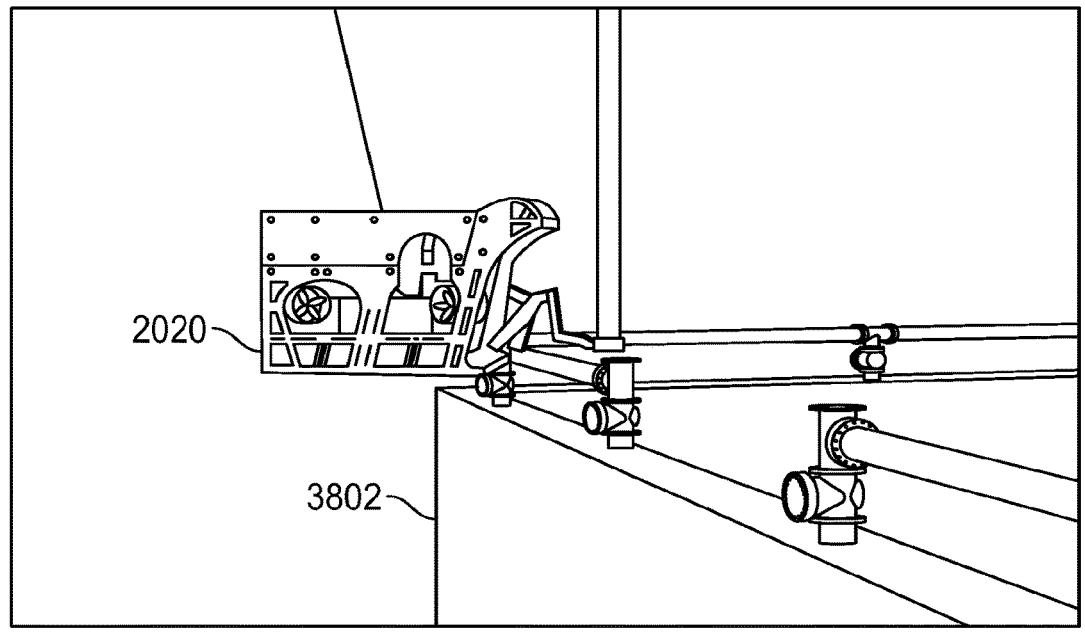
FIG. 39 is a three-dimensional perspective view of an ROV attaching hoses to fluidic conduits on the smaller cofferdam, according to an embodiment.
Figure 40:
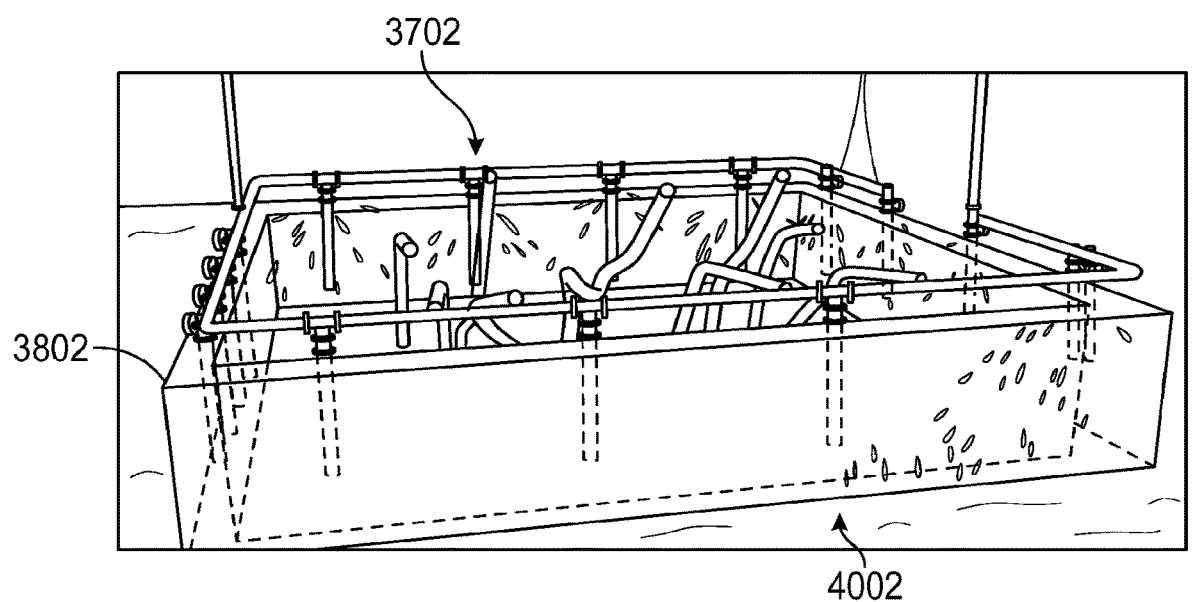
FIG. 40 is a three-dimensional perspective transparent view illustrating fluid being drawn from the smaller cofferdam through the fluidic conduits, according to an embodiment.

FIG. 39 illustrates an ROV 2020 installing fluidic connections so that fluid may be removed from the smaller cofferdam 3802, as illustrated in FIG. 40. In FIG. 40, water 4002 is being pumped out of the smaller cofferdam 3802 to cause the smaller cofferdam 3802 to descend into the seabed and enable sediment to be removed from around the damaged pipes 3702, according to an embodiment.

Figure 41:
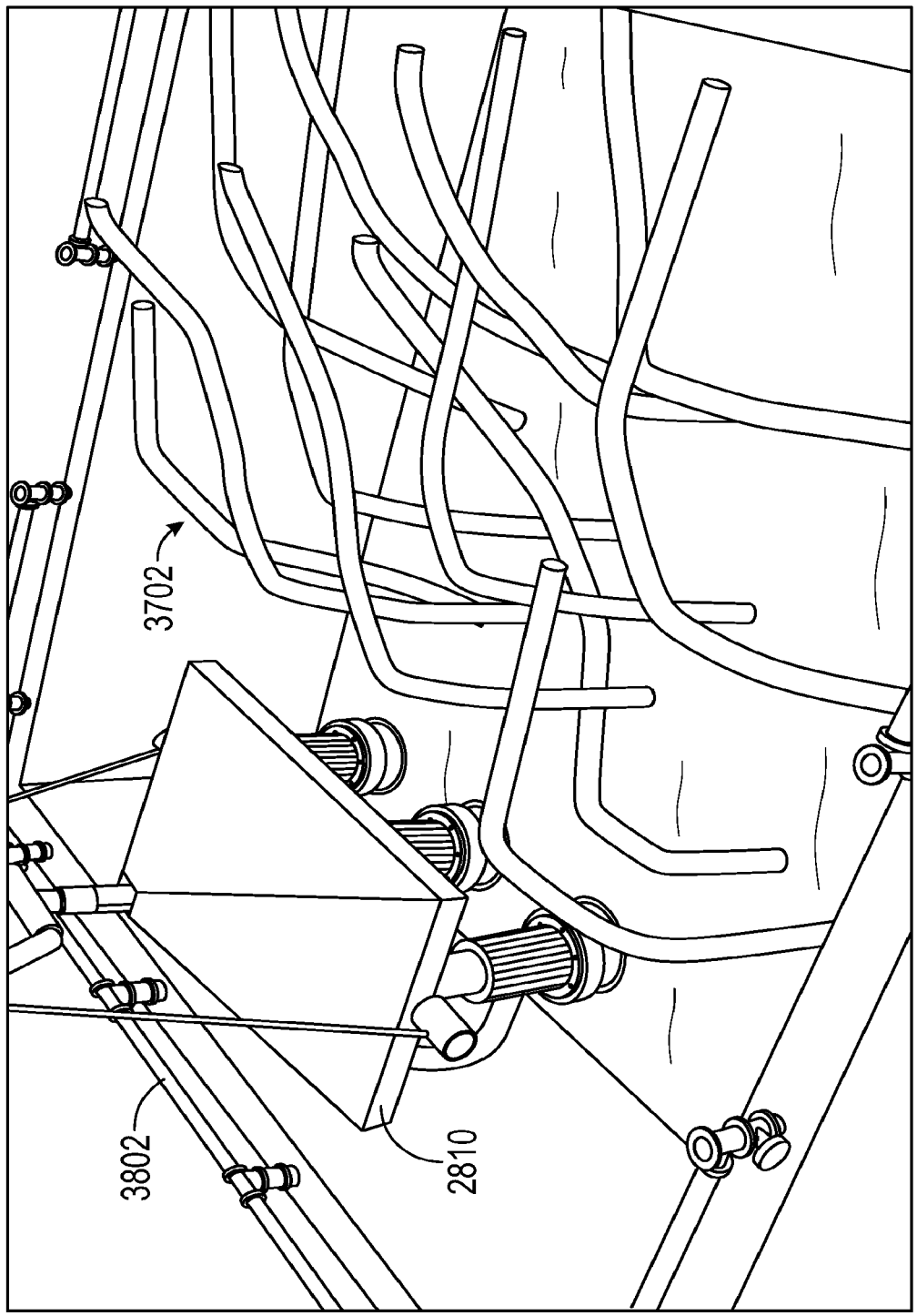
FIG. 41 is a three-dimensional perspective view of a suction system drawing water and sediment out of a region encompassed by the smaller cofferdam, according to an embodiment.

FIG. 41 illustrates the suction device 2810 removing sediment from around the damaged pipes 3702 that are encompassed by the smaller cofferdam 3802, according to an embodiment.

Figure 42:
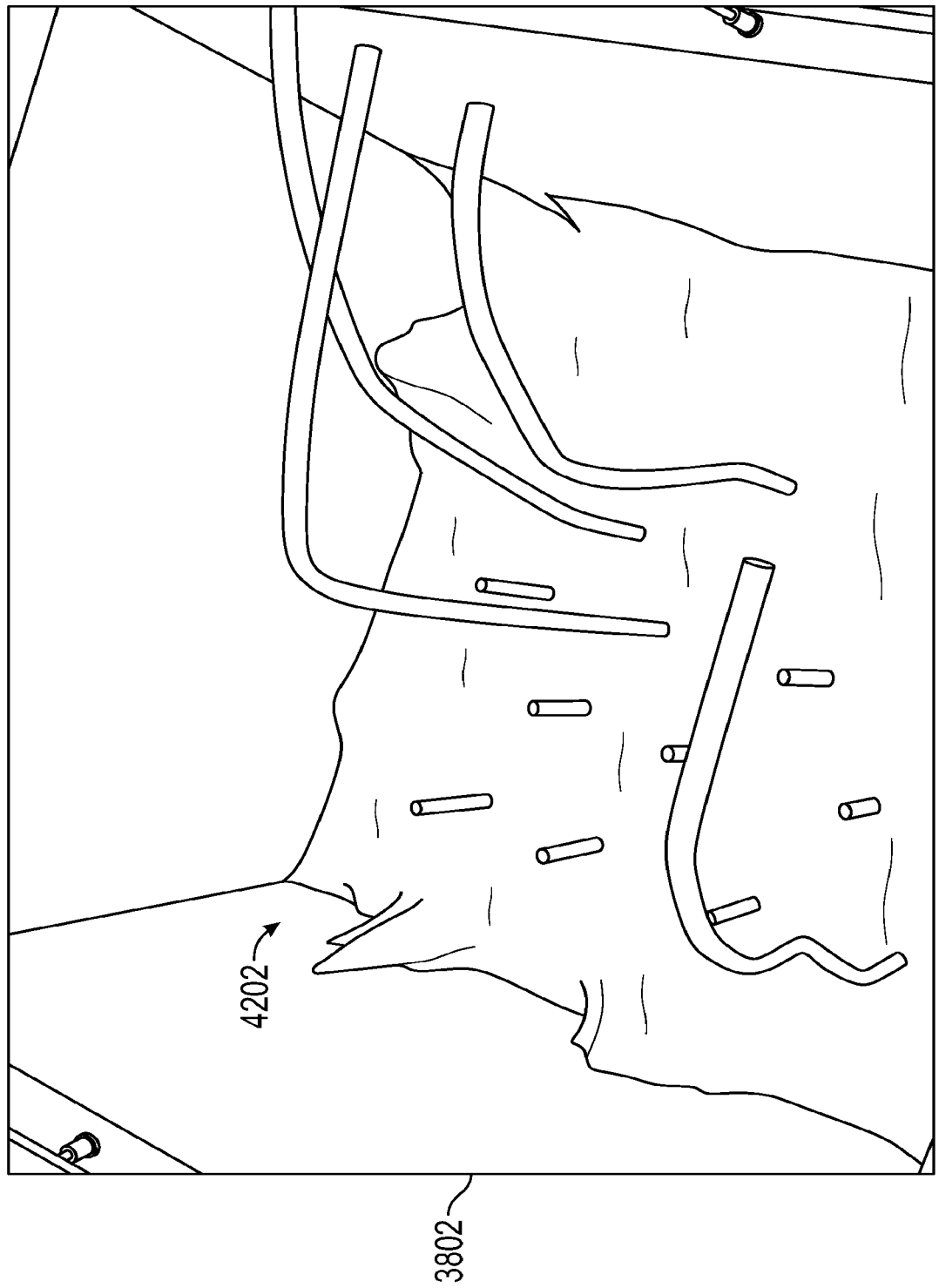
FIG. 42 is a three-dimensional perspective view of pipes that have been further cut to ready them for repair, according to an embodiment.

FIG. 42 shows damaged pipes 4202 that have been further cut in preparation for repair, according to an embodiment. In one example, the level can be ~–165' below M/L.

Figure 43:
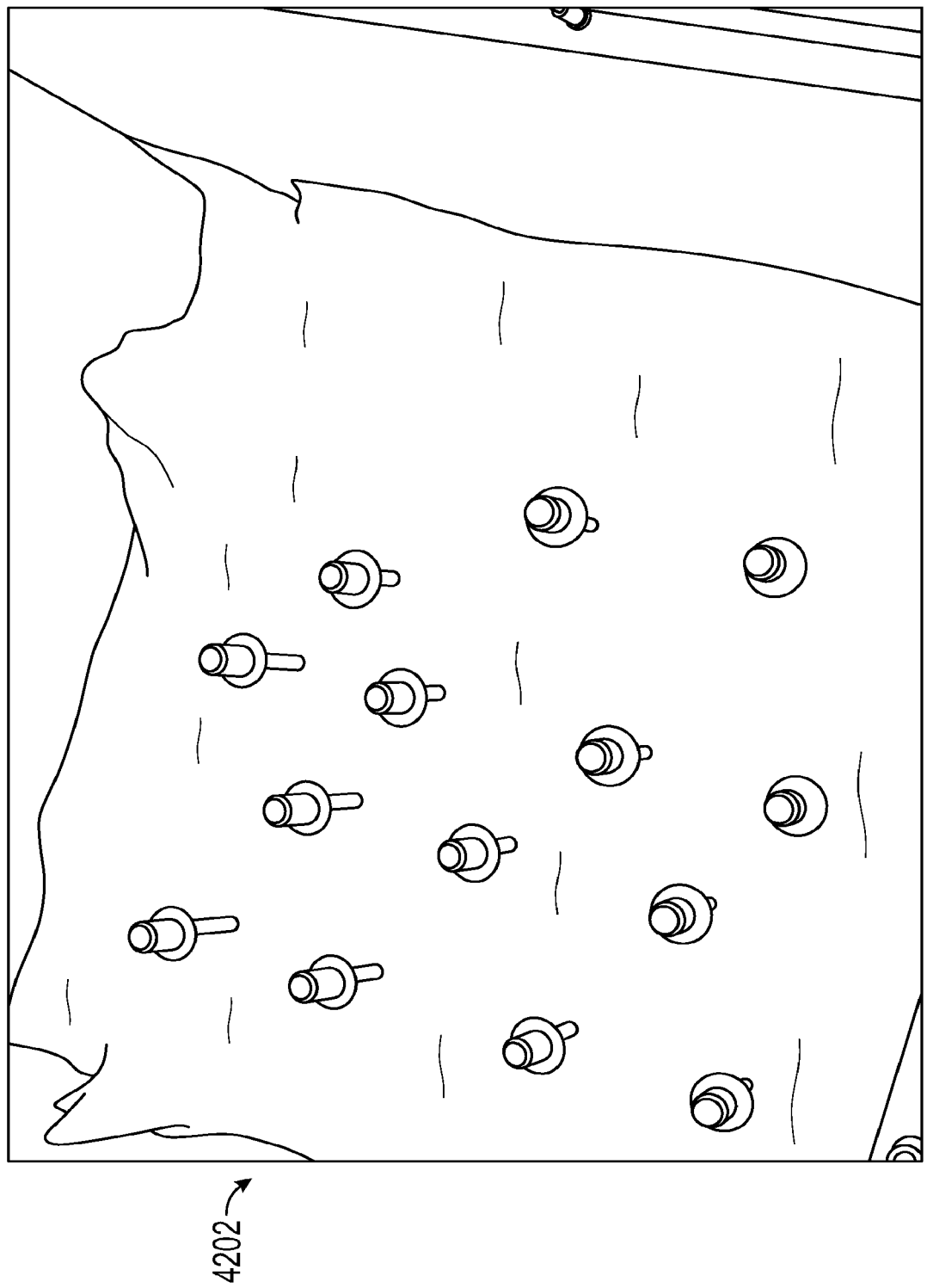
FIG. 43 is a three-dimensional perspective view of pipes that have been capped, according to an embodiment.

FIG. 43 shows damaged pipes 4202 that have been capped, according to an embodiment. In one example, the level can be ~–165' below M/L.

Figure 44:
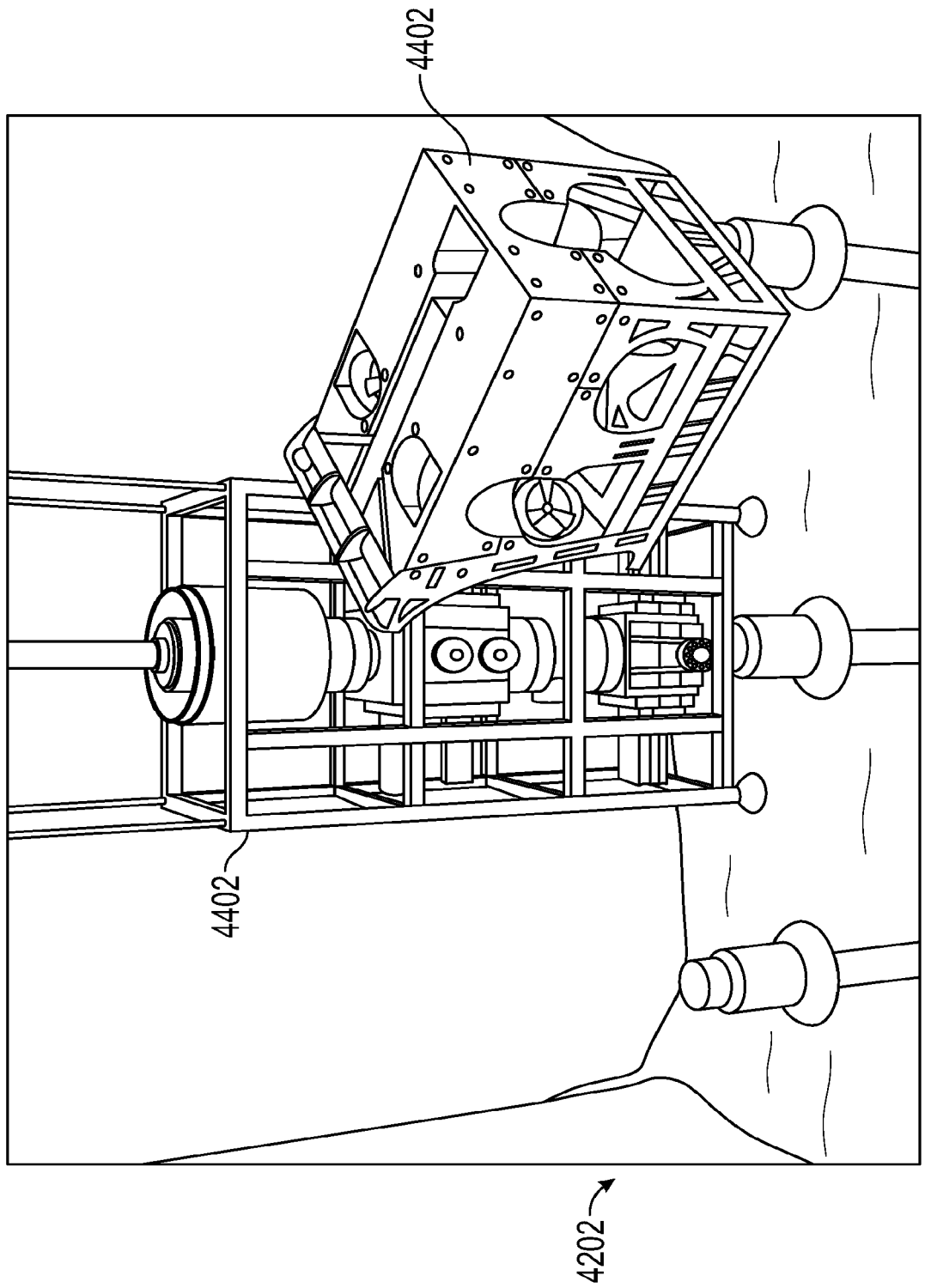
FIG. 44 is a three-dimensional perspective view of an ROV positioning a device configured to permanently seal the damaged pipes, according to an embodiment.

FIG. 44 shows an ROV 2020 positioning a device 4402 configured to permanently seal the damaged pipes 4202, according to an embodiment.

In some embodiments, each region may have a lip configured to cover a space between the suction pile and an adjacent region (e.g., covering a space between region 206a and region 206b as shown in FIG. 4). The exteriors of the regions may form a lapped surface that includes an exterior surface or an interior surface of one of the walls (see FIG. 1). Additionally, the regions can be connected by welding, bolting together, etc.

Conditional language, such as, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and annexed drawings disclose examples of cofferdams having suction piles. The examples illustrate various features of the disclosure, but those of ordinary skill in the art may recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not limiting. Although specific terms are employed herein, they are used in a generic and descriptive sense only, and not used for purposes of limitation.

What is claimed is:

1. A subsea sediment separation and filtration system, comprising:
   a first separation device having an inlet and first and second outlets, wherein the first separation device is configured to receive a water/oil/mixture into the inlet, to separate the mixture into a first component containing cleaned sediment and a second component containing an oil/water mixture, and to provide the first component through the first outlet and to provide the second component through the second outlet;
   a sediment spreader apparatus having an inlet and an outlet, wherein the first outlet of the first separation device is fluidically connected to the inlet of the sediment spreader apparatus, and wherein the sediment spreader apparatus is configured to receive the first component from the first separation device and to disperse the cleaned sediment of the first component into a subsea environment via the outlet of the sediment spreader apparatus;
   a second separation device having an inlet and first and second outlets, wherein the second outlet of the first separation device is fluidically connected to the inlet of the second separation device, wherein the second separation device is configured to receive the second component from the first separation device, to separate the second component into a cleaned water component and an oil component, to provide the cleaned water component through the first outlet of the second separation device into the subsea environment, and to provide the oil component through the second outlet; and
   a storage device having an inlet, wherein the second outlet of the second separation device is fluidically connected to the inlet of the storage device, and wherein the storage device is configured to receive the oil component from the second separation device and to store the received oil.

2. The system of claim 1, wherein the first separation device comprises hydrocyclone devices configured to separate the water/oil/mixture into the first component containing the cleaned sediment and the second component containing the oil/water mixture.

3. The system of claim 2, wherein the first separation device further comprises a plurality of hydrocyclone devices fluidically connected in parallel.

4. The system of claim 1, wherein the second separation device comprises a pressure vessel including a hydrocyclone device configured to separate the oil/water mixture of the second component into the cleaned water component and the oil component.

5. The system of claim 1, wherein the storage device includes one or more bladder skids configured to store the oil component received from the second separation device.

6. The system of claim 1, wherein the storage device is configured to allow oil to be removed from the storage device via an ROV or through fluidic connections to a topside vessel.

7. The system of claim 1, further comprising pumps configured to provide the water/oil/mixture to the first separation device, to provide the first component to the spreader apparatus, to provide the second component to the second separation device, to provide the cleaned water component to the subsea environment of the second separation device, and to provide the oil component to the storage device.

8. The system of claim 1, wherein the system is configured to perform a dredging operation to remove contaminated sediment, to clean and separate the contaminated sediment into the cleaned seawater component, the clean sediment component, and the oil component, to disperse the cleaned seawater and cleaned sediment components into the subsea environment, and to store the oil component.

\* \* \* \* \*